United States Patent
Guo

(10) Patent No.: US 12,004,196 B2
(45) Date of Patent: *Jun. 4, 2024

(54) METHOD FOR COORDINATED MULTI-ACCESS POINT AP TRANSMISSION AND RELATED APPARATUS

(71) Applicant: HUAWEI TECHNOLOGIES CO., LTD., Guangdong (CN)

(72) Inventor: Yuchen Guo, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

This patent is subject to a terminal disclaimer.

(21) Appl. No.: 18/190,658

(22) Filed: Mar. 27, 2023

(65) Prior Publication Data

US 2023/0309120 A1 Sep. 28, 2023

Related U.S. Application Data

(63) Continuation of application No. 16/988,162, filed on Aug. 7, 2020, now Pat. No. 11,647,522, which is a (Continued)

(30) Foreign Application Priority Data

Feb. 8, 2018 (CN) .......................... 201810133190.2

(51) Int. Cl.
*H04W 72/27* (2023.01)
*H04W 52/42* (2009.01)
(Continued)

(52) U.S. Cl.
CPC ........... *H04W 72/27* (2023.01); *H04W 52/42* (2013.01); *H04W 72/0446* (2013.01); *H04W 84/12* (2013.01); *H04W 88/08* (2013.01)

(58) Field of Classification Search
CPC . H04W 72/27; H04W 52/42; H04W 72/0446; H04W 84/12; H04W 88/08
See application file for complete search history.

(56) References Cited

U.S. PATENT DOCUMENTS

| 11,647,522 B2* | 5/2023 | Guo ...................... H04W 72/12 370/338 |
| 2014/0056205 A1 | 2/2014 | Aboul-Magd et al. |

(Continued)

FOREIGN PATENT DOCUMENTS

| CN | 104604325 A | 5/2015 |
| CN | 104704870 A | 6/2015 |

(Continued)

OTHER PUBLICATIONS

Extended European Search Report issued in European Application No. 18905066.9 dated Feb. 10, 2021, 8 pages.
(Continued)

*Primary Examiner* — Mohammad S Anwar
(74) *Attorney, Agent, or Firm* — Fish & Richardson P.C.

(57) ABSTRACT

Embodiments of this application disclose a method for multi-access point AP coordination and a related apparatus. The method in the embodiments of this application includes: generating, by a first access point AP, a first radio frame, where the first radio frame includes indication information used to indicate transmission duration of a second radio frame sent by a second access point AP; sending, by the first access point AP, the first radio frame to the second access point AP; and in a sending period of the second radio frame, sending, by the first access point AP, a third radio frame to a first station STA associated with the first access point AP.

19 Claims, 18 Drawing Sheets

Related U.S. Application Data continuation of application No. PCT/CN2018/107386, filed on Sep. 25, 2018.

(51) Int. Cl.
*H04W 72/0446* (2023.01)
*H04W 84/12* (2009.01)
*H04W 88/08* (2009.01)

(56) References Cited

U.S. PATENT DOCUMENTS

| | | |
|---|---|---|
| 2014/0301374 A1 | 10/2014 | Malkawi |
| 2015/0288428 A1 | 10/2015 | Choi et al. |
| 2015/0295629 A1 | 10/2015 | Xia et al. |
| 2016/0183162 A1 | 6/2016 | Jeong |
| 2016/0197655 A1 | 7/2016 | Lee et al. |
| 2018/0027591 A1 | 1/2018 | Shinohara et al. |
| 2018/0288800 A1 | 10/2018 | Yu et al. |
| 2020/0053753 A1 | 2/2020 | Tanaka |

FOREIGN PATENT DOCUMENTS

| | | |
|---|---|---|
| CN | 106851848 A | 6/2017 |
| CN | 107623931 A | 1/2018 |
| CN | 107645786 A | 1/2018 |
| EP | 2840857 A1 | 2/2015 |
| JP | 2013191908 A | 9/2013 |
| KR | 20150117218 A | 10/2015 |
| KR | 20160048879 A | 5/2016 |
| KR | 20170077125 A | 7/2017 |

OTHER PUBLICATIONS

Office Action issued in Japanese Application No. 2020-542749 dated Sep. 21, 2021, 12 pages (with English translation).
Office Action issued in Korean Application No. 2020-7025616 dated Jun. 22, 2021, 24 pages (with English translation).
Office Action issued in Korean Application No. 2020-7025616 dated Mar. 28, 2022, 4 pages (with English translation).
PCT International Search Report and Written Opinion in International Application No. PCT/CN2018/107,386, dated Dec. 29, 2018, 22 pages (With English Translation).

\* cited by examiner

| Frame control (Frame control) | Duration (Duration) | Destination address (receiver address, RA) (#9365) | Source address (transmission address, TA) | Common information field (Common Info) | User information field (User Info) | ... | User information field (User Info) | Padding (Padding) | Frame check sequence (FCS) |
|---|---|---|---|---|---|---|---|---|---|
| Octets: 2 | 2 | 6 | 6 | 8 or more | 5 or more | ... | 5 or more | variable | 4 |

FIG. 5c

| B0 B3 | B4 B15 | B16 | B17 | B18 B19 | B20 B21 | B22 | B23 B25 | B26 |
|---|---|---|---|---|---|---|---|---|
| Trigger type (Trigger Type) | Length (Length) | Cascade indication (Cascade Indication) | Call request (CSRequired) | Bandwidth (bandwidth, BW) | Guard interval and long training field type (guard interval and long training field, GI And LTF Type) | Multi-user multiple-input multiple-output training field model (MU-MIMO LTF Mode) | Quantity of high efficiency-long training field symbols Number Of (high efficiency-long training field, HE-LTF) Symbols | Space-time block coding (space-time block coding, STBC) |
| Bits: 4 | 12 | 1 | 1 | 2 | 2 | 1 | 3 | 1 |

| B27 | B28 B33 | B34 B36 | B37 B52 | B53 | B54 B62 | B63 |
|---|---|---|---|---|---|---|
| Low-density parity-check extra symbol segment (low-density parity-check, LDPC) Extra Symbol Segment | AP transmit power (AP TX Power) | Packet extension (Packet Extension) | Spatial reuse (Spatial Reuse) | Doppler (Doppler) | High efficiency signal field A reserved (high efficiency signal field, HE-SIG-A Reserved) | Reserved (Reserved) | Trigger dependent user information (Trigger Dependent Common Info) |
| Bits: 1 | 6 | 3 | 16 | 1 | 9 | 1 | variable |

FIG. 5d

| B0 B11 | B12 B19 | B20 | B21 B24 | B25 | B26 B31 | B32 B38 | B39 | |
|---|---|---|---|---|---|---|---|---|
| Association identifier 12 (association ID, AID) 12 | Resource block allocation (RU Allocation) | Coding type (Coding Type) | Modulation and coding scheme (MCS) | Double carrier modulation (double carrier modulation, DCM) | Synchronization offset allocation (spread spectrum, SS Allocation) | Target RSSI (Target RSSI) | Reserved (Reserved) | Trigger dependent user information (Trigger Dependent User Info) |
| Bits: 12 | 8 | 1 | 4 | 1 | 6 | 7 | 1 | variable |

FIG. 5e

METHOD FOR COORDINATED MULTI-ACCESS POINT AP TRANSMISSION AND RELATED APPARATUS

CROSS-REFERENCE TO RELATED APPLICATIONS

This application is a continuation of U.S. patent application Ser. No. 16/988,162, filed on Aug. 7, 2020, which is a continuation of International Application No. PCT/CN2018/107386, filed on Sep. 25, 2018, which claims priority to Chinese Patent Application No. 201810133190.2, filed on Feb. 8, 2018. All of the afore-mentioned patent applications are hereby incorporated by reference in their entireties.

TECHNICAL FIELD

This application relates to the communications field, and in particular, to a method for coordinated multi-access point AP transmission and a related apparatus.

BACKGROUND

With development of wireless networks and gradual popularization of wireless local area network (wireless local area network, WLAN) technologies, WLAN devices become increasingly dense. Because radio access points (access point, AP) are easy to deploy, increasingly dense APs also cause more inter-cell interference. How to reduce inter-cell interference through coordination between APs and improve service quality for a user also becomes a problem needing to be considered in a next generation Wi-Fi technology.

In the prior art, inter-cell interference may be reduced by using a coordinated beamforming (coordinated beamforming, co-BF) technology. Based on the co-BF technology, a relatively low correlation between effective channels can be maintained. For example, FIG. 1a is an example of a schematic diagram of a co-BF technology in the prior art. In the figure, an AP 1 is associated with a station (station, STA) 1, and an AP 2 is associated with a STA 2. Before the AP 1 transmits data with the STA 1 and the AP 2 transmits data with the STA 2, the AP 1 needs to obtain channel state information (channel state information, CSI) of a downlink channel between the AP 1 and the STA 1, and perform joint beamforming based on the CSI, so that when a beam is projected on the STA 1, a direction of the STA 2 is bypassed, to avoid interference to the STA 2. In addition, the same is true with the AP 2. Therefore, in a scenario in which co-BF is used, concurrent transmission of two APs can be implemented, and interference between the transmission of the two APs can be avoided; and an overall network throughput can be effectively increased.

However, a CSI obtaining process is relatively complex and occupies some channel resources. When there are a relatively large quantity of users and channel changes are fast, CSI feedback incurs high overheads.

SUMMARY

Embodiments of this application provide a method for coordinated multi-access point AP transmission and a related apparatus, to resolve a prior-art problem that a relatively large quantity of channel resources are occupied for obtaining CSI.

A first aspect of the embodiments of this application provides a method for coordinated multi-access point AP transmission, including: generating, by a first access point AP, a first radio frame, where the first radio frame includes indication information, and the indication information is used to indicate transmission duration of a second radio frame sent by a second access point AP; sending, by the first access point AP, the first radio frame to the second access point AP after generating the first radio frame; and in a sending period of the second radio frame, sending, by the first access point AP, a third radio frame to a first station STA associated with the first access point AP. In this embodiment of this application, the first access point AP sends the first radio frame to the second access point AP, so that at least one second access point AP may simultaneously send second radio frames with same transmission duration to the second station STA based on the first radio frame. A plurality of access points APs are synchronized by sending control information, thereby resolving a prior-art problem that a relatively large quantity of channel resources are occupied for obtaining CSI.

In a possible implementation, the indication information includes a sending time and an end time of the second radio frame. In this implementation, the first access point AP indicates the sending time and the end time of the second radio frame to the second access point AP, so that the second access point AP can determine the transmission duration of the second radio frame through the indication.

In a possible implementation, a sending time of the third radio frame is the same as the sending time of the second radio frame. In this implementation, the third radio frame and the second radio frame are sent at the same sending time, thereby reducing interference between the first access point AP and the second access point AP.

In a possible implementation, a sending time of the third radio frame is before the sending time of the second radio frame. In this implementation, the sending time of the third radio frame may be earlier than the sending time of the second radio frame, and for the first station STA and the second station STA, after transmission of a radio frame with a later end time in the second radio frame and the third radio frame is ended, the first station STA may further send an acknowledgement frame in response to the third radio frame, and the second station STA may further send an acknowledgement frame in response to the second radio frame, thereby avoiding a case in which while one access point AP performs sending, another access point AP performs receiving, and reducing a value of interference between the first AP and the second AP.

In a possible implementation, the indication information includes identifier information of the second access point AP. In this implementation, the first radio frame may further include the identifier information of the second access point AP, to help a plurality of second APs determine, based on the identifier information, whether to participate in coordinated transmission with the first access point AP.

In a possible implementation, the first radio frame further carries one or more of the following: transmit power information of the second access point AP; information about a maximum tolerable interference threshold for the first access point AP; identifier information of the first station STA; transmit power information of the first station STA; and transmit power information of the first access point AP. In this implementation, the first radio frame may further carry a plurality of other types of indication information, to add a multi-AP joint resource management function. Transmit power of the second access point AP and the transmit power information of the first access point may be coordinated, to effectively control interference of the first access point AP to the second station STA and interference of the second access point AP to the first station STA. The information about the maximum tolerable interference threshold for the first access point AP is indicated to the second access point AP, so that the second access point AP controls transmit power of the second station STA, to prevent a value of interference of the second station STA to the first access point AP from exceeding the information about the maximum tolerable interference threshold for the first access point AP. The identifier information of the first station STA and the transmit power information of the first station STA are indicated to the second access point AP, so that the second access point AP can predict a value of interference of the first station STA to the second access point AP, and the interference of the first station STA to the second access point AP can be effectively controlled.

In a possible implementation, transmission duration of the third radio frame is the same as the transmission duration of the second radio frame. In this implementation, the first access point AP configures the transmission duration of the second radio frame to be the same as the transmission duration of the third radio frame, so that the end time of the second radio frame can be aligned with an end time of the third radio frame, thereby reducing interference between the first access point AP and the second access point AP.

In a possible implementation, before the sending, by the first access point AP, the first radio frame to the second access point AP, the method further includes: determining, by the first access point AP, the second access point AP; and allocating, by the first access point AP, resource scheduling information to the second access point AP, where the resource scheduling information is used to indicate a channel resource used by the second access point AP to send the second radio frame. In this implementation, the first access point AP allocates, to the second access point AP, the channel resource used by the second access point AP to send the second radio frame, thereby improving efficiency of sending the second radio frame by the second access point AP.

In a possible implementation, before the sending, by the first access point AP, the first radio frame to the second access point AP, the method further includes: successfully obtaining, by the first access point AP, a channel through contention, to transmit the first radio frame; or receiving, by the first access point AP, a request frame sent by an access point AP that successfully obtains a channel through contention, where the request frame is used to request the first access point AP to send the first radio frame by using the channel. In this implementation, the first access point AP may contend for a channel to transmit the first radio frame, or may transmit the first radio frame by using a channel obtained through contention by another AP, thereby improving flexibility of transmitting the first radio frame by the first access point AP.

A second aspect of the embodiments of this application provides a method for coordinated multi-access point AP transmission, including: receiving, by a second access point AP, a first radio frame sent by a first access point AP, where the first radio frame includes indication information used to indicate transmission duration of a second radio frame; and after receiving the first radio frame, in a sending period of sending a third radio frame by the first access point AP to a first station STA associated with the first access point AP, sending, by the second access point AP, the second radio frame to a second station STA associated with the second access point AP. In this embodiment of this application, the second access point AP receives the first radio frame sent by the first access point AP, so that at least one second access point AP may simultaneously send second radio frames with same transmission duration to the second station STA based on the first radio frame. A plurality of access points APs are synchronized by sending control information, thereby resolving a prior-art problem that a relatively large quantity of channel resources are occupied for obtaining CSI.

In a possible implementation, the indication information includes a sending time and an end time of the second radio frame. In this implementation, the first access point AP indicates the sending time and the end time of the second radio frame to the second access point AP by using the first radio frame, so that the second access point AP can determine the transmission duration of the second radio frame through the indication.

In a possible implementation, the sending time of the second radio frame is the same as a sending time of the third radio frame, the third radio frame is sent in a sending period of the second radio frame by the first access point AP to the first station STA associated with the first access point AP, and transmission duration of the third radio frame is the same as the transmission duration of the second radio frame. In this implementation, it indicates that the third radio frame and the second radio frame are sent at the same sending time, thereby reducing interference between the first access point AP and the second access point AP.

In a possible implementation, the sending time of the second radio frame is before a sending time of the third radio frame. In this implementation, the sending time of the second radio frame may be earlier than the sending time of the third radio frame, and for the first station STA and the second station STA, after transmission of a radio frame with a later end time in the second radio frame and the third radio frame is ended, the first station STA may further send an acknowledgement frame in response to the third radio frame, and the second station STA may further send an acknowledgement frame in response to the second radio frame, thereby avoiding a case in which while one access point AP performs sending, another access point AP performs receiving, and reducing a value of interference between the first AP and the second AP.

In a possible implementation, the indication information includes identifier information of the second access point AP. In this implementation, the first radio frame may further include the identifier information of the second access point AP, to help a plurality of second APs determine, based on the identifier information, whether to participate in coordinated transmission with the first access point AP.

In a possible implementation, the first radio frame further carries one or more of the following: transmit power information of the second access point AP; information about a maximum tolerable interference threshold for the first access point AP; identifier information of the first station STA; transmit power information of the first station STA; and transmit power information of the first access point AP. In this implementation, the first radio frame may further carry a plurality of other types of indication information, to add a multi-AP joint resource management function. Transmit power of the second access point AP and the transmit power information of the first access point may be coordinated, to effectively control interference of the first access point AP to the second station STA and interference of the second access point AP to the first station STA. The information about the maximum tolerable interference threshold for the first access point AP is indicated to the second access point AP, so that the second access point AP controls transmit power of the second station STA, to prevent a value of interference of the second station STA to the first access point AP from exceeding the information about the maximum tolerable interference threshold for the first access point AP. The identifier information of the first station STA and the transmit power information of the first station STA are indicated to the second access point AP, so that the second access point AP can predict a value of interference of the first station STA to the second access point AP, and the interference of the first station STA to the second access point AP can be effectively controlled.

In a possible implementation, the transmission duration of the second radio frame is the same as transmission duration of the third radio frame. In this implementation, the first access point AP configures the transmission duration of the second radio frame to be the same as the transmission duration of the third radio frame, so that the end time of the second radio frame can be aligned with an end time of the third radio frame, thereby reducing interference between the first access point AP and the second access point AP.

In a possible implementation, before the receiving, by the second access point, the first ratio frame sent by the first access point AP, the method further includes: when the second access point AP successfully obtains a channel through contention, sending, by the second access point AP, a request frame to the first access point AP, where the request frame is used to request the first access point AP to send the first radio frame by using the channel. In this implementation, a manner in which the first access point AP accesses a channel is provided, so that the first access point AP can transmit the first radio frame based on the channel obtained through contention by the second access point AP.

In a possible implementation, the indication information further includes resource scheduling information, and the resource scheduling information is used to indicate a channel resource used by the second access point AP to send the second radio frame. In this implementation, the first access point AP allocates, to the second access point AP, the channel resource used to send the second radio frame, thereby improving efficiency of sending the second radio frame by the second access point AP.

A third aspect of the embodiments of this application provides a method for coordinated multi-access point AP transmission, including: generating, by a first access point AP, a first radio frame; and after generating the first radio frame, sending, by the first access point AP, the first radio frame to a second access point AP, where the first radio frame is used to trigger the second access point AP to send a second radio frame to a second station STA associated with the second access point AP, and the first radio frame includes first indication information, so that the second access point AP determines a transmission end time of the second radio frame according to the first indication information. In this embodiment of this application, the first access point AP sends the first radio frame to the second access point AP, to trigger the second access point AP to send the second radio frame to the second station STA, and the second access point AP may determine the transmission end time of the second radio frame according to the first indication information in the first radio frame, so that a plurality of second access points APs can end transmission at the same time, to be specific, a case in which while one AP performs sending, another AP performs receiving is avoided, thereby reducing interference between the APs and between the STAs.

A fourth aspect of the embodiments of this application provides a method for coordinated multi-access point AP transmission, including: receiving, by a second access point AP, a first radio frame sent by a first access point AP, where the first radio frame carries first indication information; determining, by the second access point AP, a transmission end time of a second radio frame according to the first indication information; and sending, by the second access point AP, the second radio frame to a second station STA associated with the second access point AP. In this embodiment of this application, the second access point AP receives the first radio frame sent by the first access point AP, and determines the transmission end time of the second radio frame according to the first indication information in the first radio frame, so that a plurality of second access points APs can end transmission at the same time, to be specific, a case in which while one AP performs sending, another AP performs receiving is avoided, thereby reducing interference between the APs and between the STAs.

In a possible implementation, the first indication information is used to indicate a transmission end time of the first radio frame or transmission duration of the first radio frame, and the transmission end time of the first radio frame is the same as the transmission end time of the second radio frame. The determining, by the second access point AP, a transmission end time of a second radio frame according to the first indication information includes: determining, by the second access point AP, the transmission end time of the first radio frame as the transmission end time of the second radio frame; or determining, by the second access point AP, the transmission end time of the first radio frame based on the transmission duration of the first radio frame and a transmission start time of the first radio frame, where the transmission end time of the first radio frame is equal to the transmission end time of the second radio frame. In this implementation, the transmission end time of the second radio frame sent by the second access point AP is the same as the transmission end time of the first radio frame sent by the first access point AP, so that a case in which while one access point performs sending, another access point performs receiving is avoided, and correspondingly, a case in which while one station receives data, another station sends an acknowledgement frame is also avoided, thereby avoiding interference between the access points and interference between the stations.

A fifth aspect of the embodiments of this application provides a channel information prediction method, including: receiving, by a first station STA, a broadcast frame from a first access point AP, where the broadcast frame includes identifier information of a second access point AP, the broadcast frame is used to trigger the first station STA to detect a channel between the second access point AP and the first station STA, and the first station STA is associated with the first access point AP; determining, by the first station STA, channel quality information of a target channel based on a received radio frame sent by a target AP, where the target channel is a channel between the target AP and the first station STA, and the target AP is included in the second access point AP; and sending, by the first station STA, a feedback frame to the first access point AP, where the feedback frame includes the channel quality information of the target channel. In this embodiment of this application, when scheduling the first station STA for transmission, the first access point AP can select a suitable MCS based on the channel quality information of the target channel fed back by the first station STA, to achieve balance between a transmission rate and a packet loss rate.

In a possible implementation, the broadcast frame may further include order indication information, and the order indication information is used to instruct the second access point AP to sequentially broadcast null data packets NDPs.

In this implementation, the first access point AP may instruct the second access point AP to sequentially send the NDPs, so that the first station STA measures channel information based on NDPs sequentially sent by a plurality of second access points APs. Compared with a manner in which the first station STA measures channel information by receiving beacon frames that are sent by the plurality of second access points APs after different time periods, this is more orderly and efficient.

In a possible implementation, the radio frame sent by the target AP may be an NDP, and after the receiving, by the first station STA, the radio frame sent by the target AP and before the sending, by the first station STA, a feedback frame to the first access point AP, the method further includes: determining, by the first station STA based on the order indication information, an AP that is the target AP. In this implementation, after receiving the radio frame, the first station STA needs to determine, based on the order indication information, an AP that sends the radio frame, so that when the first station STA provides a feedback to the first access point AP, the first access point AP can learn of an access point, where a channel between the first station STA and the access point is detected.

In a possible implementation, before the sending, by the first station STA, a feedback frame to the first access point AP, the method further includes: receiving, by the first station STA, a trigger frame sent by the first access point AP, where the trigger frame is used to trigger the first station STA to send the feedback frame, the trigger frame includes resource scheduling information, and the resource scheduling information is used to indicate a channel resource used by the first station STA to send the feedback frame; or successfully obtaining, by the first station STA, a channel through contention, where the channel is used to send the feedback frame. In this implementation, two manners in which the first station STA sends the feedback frame are provided, and include a manner in which the feedback frame is sent by using the channel resource allocated by the first access point AP or a manner in which the feedback frame is sent by using the channel obtained through contention. If the feedback frame is sent by using the channel resource allocated by the first access point AP, the first STA may not need to contend for a channel, thereby improving efficiency of sending the feedback frame by the first station STA.

A sixth aspect of the embodiments of this application provides a channel information prediction method, including: sending, by a first access point AP, a broadcast frame to a first station STA associated with the first access point AP, where the broadcast frame carries identifier information of a second access point AP, and the broadcast frame is used to trigger the first station STA to detect a channel between the second access point AP and the first station STA; and receiving, by the first access point AP, a feedback frame sent by the first station STA, where the feedback frame carries channel quality information of a target channel detected by the first station STA, the target channel is a channel between a target AP and the first station STA, the target AP is an AP for communicating with the first station STA, and the target AP is included in the second access point AP. In this embodiment of this application, the first access point AP triggers, by using the broadcast frame, the first station STA to detect the channel between the second access point AP and the first station STA, and receives the channel quality information of the target channel that is fed back by the first station STA and that can be detected by the second access point AP, so that the first access point AP can predict a signal-to-interference ratio of the first station STA based on the channel quality information of the target channel, and further, when scheduling the first station STA for transmission, the first access point AP can select a suitable MCS, to achieve balance between a transmission rate and a packet loss rate.

In a possible implementation, after the receiving, by the first access point AP, a feedback frame sent by the first station STA, the method further includes: determining, by the first access point AP, a signal-to-interference ratio SIR of the first station STA based on the channel quality information of the target AP. In this implementation, the first access point AP determines the SIR of the first station STA, so that when scheduling the first station STA for transmission, the first access point AP can select a suitable MCS, to achieve balance between transmission data and a packet loss rate.

In a possible implementation, before the receiving, by the first access point AP, a feedback frame sent by the first station STA, the method further includes: sending, by the first access point AP, a trigger frame to the first station STA, where the trigger frame is used to trigger the first station STA to send the feedback frame, the trigger frame carries resource scheduling information, and the resource scheduling information is used to indicate a channel resource used by the first station STA to send the feedback frame. In this implementation, a manner in which the first station STA sends the feedback frame is provided, and includes a manner in which the feedback frame is sent by using the channel resource allocated by the first access point AP, thereby improving efficiency of sending the feedback frame by the first station STA.

In a possible implementation, the broadcast frame further carries order indication information, and the order indication information is used to indicate an order in which the second access point AP sends null data packets NDPs, so that the first station STA performs signal quality detection on a channel between the second access point AP and the first station STA based on the received NDPs. In this implementation, the first access point AP may instruct the second access point AP to sequentially send the NDPs, so that the first station STA measures channel information based on NDPs sequentially sent by a plurality of second access points APs. Compared with a manner in which the first station STA measures channel information by receiving beacon frames that are sent by the plurality of second access points APs after different time periods, this is more orderly and efficient.

A seventh aspect of the embodiments of this application provides an apparatus for coordinated multi-access point AP transmission. The apparatus is applied to a first access point AP side, and includes: a processor, configured to generate a first radio frame, where the first radio frame includes indication information used to indicate transmission duration of a second radio frame sent by a second access point AP; and a transceiver, configured to send the first radio frame to the second access point AP, where the transceiver is further configured to: in a sending period of the second radio frame, send a third radio frame to a first station STA associated with the first access point AP. In this embodiment of this application, the transceiver sends the first radio frame to the second access point AP, so that at least one second access point AP may simultaneously send second radio frames with same transmission duration to a second station STA based on the first radio frame. A plurality of access points APs are synchronized by sending control information, thereby resolving a prior-art problem that a relatively large quantity of channel resources are occupied for obtaining CSI.

An eighth aspect of the embodiments of this application provides an apparatus for coordinated multi-access point AP transmission. The apparatus is applied to a second access point AP side, and includes: a transceiver, configured to receive a first radio frame sent by a first access point AP, where the first radio frame includes indication information for transmission duration of a second radio frame, where the transceiver is further configured to: in a sending period of sending a third radio frame by the first access point AP to a first station STA associated with the first access point, send the second radio frame to a second station STA associated with the second access point AP. In this embodiment of this application, the transceiver receives the first radio frame sent by the first access point AP, and simultaneously sends second radio frames with same transmission duration to the second station STA based on the first radio frame. A plurality of access points APs are synchronized by sending control information, thereby resolving a prior-art problem that a relatively large quantity of channel resources are occupied for obtaining CSI.

A ninth aspect of the embodiments of this application provides an apparatus for coordinated multi-access point AP transmission. The apparatus is applied to a first access point AP side, and includes: a processor, configured to generate a first radio frame; and a transceiver, configured to send the first radio frame to a second access point AP, where the first radio frame is used to trigger the second access point AP to send a second radio frame to a second station STA associated with the second access point AP, the first radio frame includes first indication information, and the first indication information is used by the second access point AP to determine a transmission end time of the second radio frame. In this embodiment of this application, the transceiver sends the first radio frame to the second access point AP, to trigger the second access point AP to send the second radio frame to the second station STA, so that the second access point AP can determine the transmission end time of the second radio frame according to the first indication information in the first radio frame, and a plurality of second access points APs can end transmission at the same time, to be specific, a case in which while one AP performs sending, another AP performs receiving is avoided, thereby reducing interference between the APs and between the STAs.

A tenth aspect of the embodiments of this application provides an apparatus for coordinated multi-access point AP transmission. The apparatus is applied to a second access point AP side, and includes: a transceiver, configured to receive a first radio frame sent by a first access point AP, where the first radio frame carries first indication information; and a determining unit, configured to determine a transmission end time of a second radio frame according to the first indication information, where the transceiver is further configured to send the second radio frame to a second station STA associated with the second access point AP. In this embodiment of this application, the transceiver receives the first radio frame sent by the first access point AP, and further, the determining unit determines the transmission end time of the second radio frame according to the first indication information in the first radio frame, so that a plurality of second access points APs can end transmission at the same time, to be specific, a case in which while one AP performs sending, another AP performs receiving is avoided, thereby reducing interference between the APs and between the STAs.

An eleventh aspect of the embodiments of this application provides a channel information detection apparatus. The apparatus is applied to a first station STA side, and includes: a transceiver, configured to receive a broadcast frame sent by a first access point AP, where the broadcast frame includes identifier information of a second access point AP, the broadcast frame is used to trigger the first station STA to detect a channel between the second access point AP and the first station STA, and the first station STA is associated with the first access point AP; and a determining unit, configured to determine channel quality information of the target channel based on a received radio frame sent by a target AP, where the target channel is a channel between the target AP and the first station STA, and the target AP is included in the second access point AP, where the transceiver is further configured to send a feedback frame to the first access point AP, where the feedback frame includes the channel quality information of the target channel. In this embodiment of this application, when scheduling the first station STA for transmission, the first access point AP can select a suitable MCS based on the channel quality information of the target channel fed back by the first station STA, to achieve balance between a transmission rate and a packet loss rate.

A twelfth aspect of the embodiments of this application provides a channel information detection apparatus. The apparatus is applied to a first access point AP side, and includes: a transceiver, configured to: send a broadcast frame to a first station STA associated with the first access point AP, where the broadcast frame carries identifier information of a second access point AP, and the broadcast frame is used to trigger the first station STA to detect a channel between the second access point AP and the first station STA; and receive a feedback frame sent by the first station STA, where the feedback frame carries channel quality information of a target channel detected by the first station STA, the target channel is a channel between a target AP and the first station STA, and the target AP is included in the second access point AP. In this embodiment of this application, the transceiver triggers, by using the broadcast frame, the first station STA to detect the channel between the second access point AP and the first station STA, and receives the channel quality information of the target channel that is fed back by the first station STA and that can be detected by the second access point AP, so that the first access point AP can predict a signal-to-interference ratio of the first station STA based on the channel quality information of the target channel, and further, when scheduling the first station STA for transmission, the first access point AP can select a suitable MCS, to achieve balance between a transmission rate and a packet loss rate.

A thirteenth aspect of the embodiments of this application provides a communications apparatus. The communications apparatus has functions of implementing behavior of the first access point AP or behavior of the second access point AP in the foregoing method design. The functions may be implemented by hardware, or may be implemented by hardware executing corresponding software. The hardware or the software includes one or more modules corresponding to the functions. The modules may be software and/or hardware.

In a possible implementation, the communications apparatus includes a storage unit, a processing unit, and a communications unit.

The storage unit is configured to store program code and data that are required by the communications apparatus. The processing unit is configured to invoke the program code, to control and manage an action of the communications apparatus. The communications unit is configured to support the communications apparatus in communicating with another device.

In a possible implementation, a structure of the communications apparatus includes a processor, a memory, a baseband circuit, a radio frequency circuit, an antenna, and a bus. The processor, the memory, the baseband circuit, the radio frequency circuit, and the antenna are connected to each other by using the bus. The memory stores a corresponding operation instruction. The processor executes the operation instruction, to control the radio frequency circuit, the baseband circuit, and the antenna to work, to support the first access point AP or the second access point AP in performing a corresponding function in the foregoing method.

Another aspect of the embodiments of this application provides a station. The station has functions of implementing the station in the foregoing method embodiment. The functions may be implemented by hardware, or may be implemented by hardware executing corresponding software. The hardware or the software includes one or more modules corresponding to the functions.

Another aspect of the embodiments of this application provides a station, including a processor, a memory, a bus, a transmitter, and a receiver. The memory is configured to store a computer executable instruction. The processor is connected to the memory by using the bus. When the station is run, the processor executes the computer executable instruction stored in the memory, so that the station performs the channel information prediction method according to the fifth aspect.

Another aspect of the embodiments of this application provides an apparatus. The apparatus includes a memory. The memory is configured to store an instruction. When executed by a processor, the instruction stored in the memory enables the processor to implement a corresponding function that is performed by the first access point AP, the second access point AP, or the first station STA in the foregoing method, for example, sending or processing data and/or information in the foregoing method. The apparatus may include a chip, or may include a chip and another discrete component.

Another aspect of the embodiments of this application provides a system. The system includes the first access point AP according to the first aspect and the second access point AP according to the second aspect, or includes the first access point AP according to the third aspect and the second access point AP according to the fourth aspect; or includes the first station STA according to the fifth aspect and the first access point AP according to the sixth aspect; or includes the first access point AP according to the seventh aspect and the second access point AP according to the eighth aspect; or includes the first access point AP according to the ninth aspect and the second access point AP according to the tenth aspect; or includes the first access point AP according to the eleventh aspect and the second access point AP according to the twelfth aspect.

Another aspect of the embodiments of this application provides a computer-readable storage medium. The computer-readable storage medium stores an instruction, and when run on a computer, the instruction enables the computer to perform the methods according to the foregoing aspects.

Another aspect of the embodiments of this application provides a computer program product including an instruction. When run on a computer, the instruction enables the computer to perform the methods according to the foregoing aspects.

It can be learned from the foregoing technical solutions that, in the embodiments of this application, the first access point AP sends the first radio frame to the second access point AP, so that at least one second access point AP may simultaneously send second radio frames with same transmission duration to the second station STA based on the first radio frame. A plurality of access points APs are synchronized by sending control information, to be specific, a case in which while one AP performs sending, another AP performs receiving is avoided, thereby reducing interference between the APs and between the STAs.

BRIEF DESCRIPTION OF DRAWINGS

FIG. 5c is an example of a diagram of a frame structure of a trigger frame defined in a standard;

FIG. 5d is a schematic diagram of an example of information included in a common information field Common info part in a trigger frame Trigger;

FIG. 5e is a schematic diagram of information that may be included in a user information field User Info part in a trigger frame;

DESCRIPTION OF EMBODIMENTS

Embodiments of this application provide a method for coordinated multi-AP transmission and a related apparatus, to resolve a prior-art problem that a relatively large quantity of channel resources are occupied for obtaining CSI.

The following clearly and completely describes the technical solutions in the embodiments of this application with reference to the accompanying drawings in the embodiments of this application. Apparently, the described embodiments are merely some but not all of the embodiments of this application.

Figure 1A:
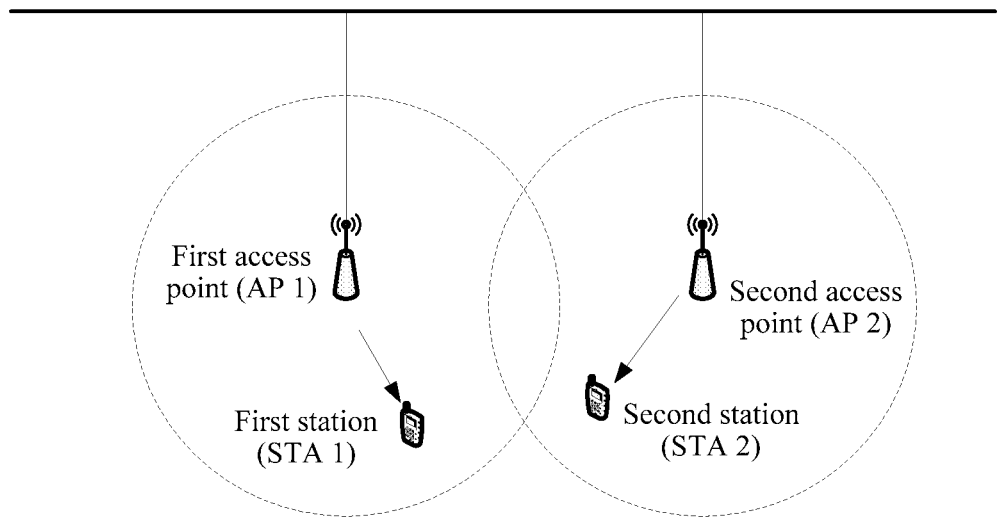
FIG. 1a is an example of a schematic diagram of a co-BF technology in the prior art.
Figure 1B:
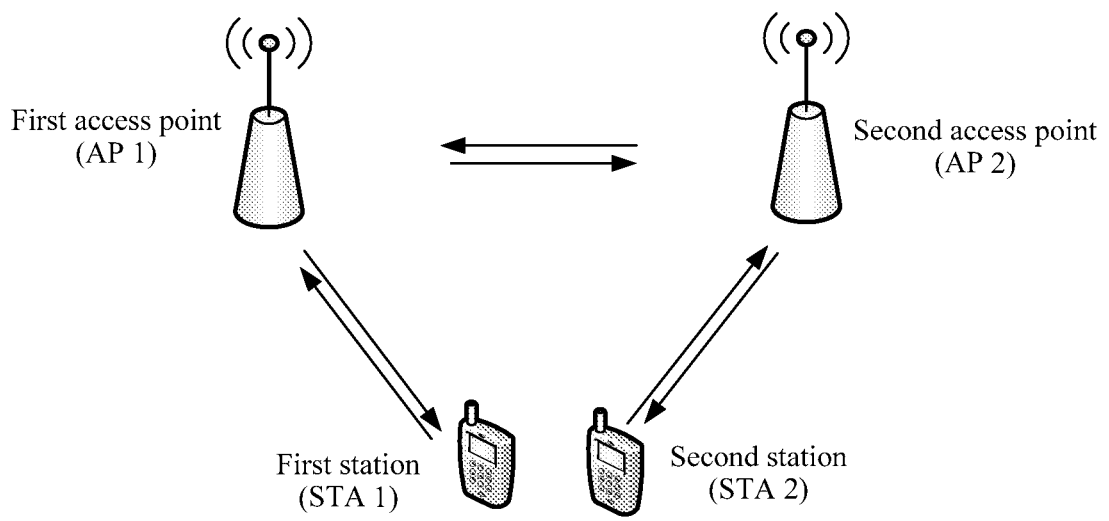
FIG. 1b is an example of an architectural diagram of a system according to an embodiment of this application.

An embodiment of this application provides a method for coordinated multi-AP transmission. The method may be applied to a wireless local area network. FIG. 1*b* is an example of an architectural diagram of a system according to an embodiment of this application. The system includes at least two radio access points: an AP 1 and an AP 2, and two stations: a STA 1 and a STA 2. The STA 1 is a station associated with the AP 1, and the STA 2 is a station associated with the AP 2. In this embodiment of this application, the first AP 1 may exchange control information with the second AP 2, to implement coordination of transmission when the APs perform transmission with the associated STAs, thereby resolving a prior-art problem that a relatively large quantity of channel resources are occupied for obtaining CSI, and reducing transmission interference.

It may be understood that, a quantity of APs and a quantity of STAs in the WLAN communications system are merely examples, and do not constitute a limitation on this embodiment of this application. Persons skilled in the art may understand that, the AP in this embodiment of this application is an apparatus that is deployed in a wireless communications network and that provides a wireless communication function for a station, and may be used as a hub for a WLAN. For example, the AP may be a base station, a router, a gateway, or a repeater. The base station may include various forms of macro base stations, micro base stations, relay nodes, and the like. Correspondingly, the STA in this embodiment of this application may be a proper apparatus connected to a distributed network through a radio link. For example, the STA may be a user terminal, a user apparatus, an access apparatus, a mobile station, user equipment, or another name. The user terminal may include various handheld devices having a wireless communication function, an in-vehicle device, a wearable device (such as a smartwatch or a smart band), a computing device, or another processing device connected to a wireless modem, and various forms of user equipments (user equipment, UE), a mobile station (mobile station, MS), a terminal (terminal), terminal equipment (terminal equipment), a portable communications device (such as a cellular GPRS phone), a handset, a portable computing device, an entertainment device, a game device or system, a global positioning system device, an ultra wideband (ultra wideband, UWB) apparatus, a wireless apparatus, or any other suitable device configured to perform network communication through a wireless medium.

In the embodiments of this application, for different scenarios, there may be a plurality of methods for coordinated multi-AP transmission. Coordinated multi-AP transmission in the embodiments of this application means that two or more APs cooperate with each other by exchanging control information, to schedule a radio resource. The methods for coordinated multi-AP transmission include the following methods:

Method A: implementation of synchronous and aligned transmission of a plurality of APs during downlink transmission;

Method B: implementation of synchronous and aligned transmission of a plurality of STAs during uplink transmission; and Method C: implementation of aligned transmission of a plurality of APs during downlink transmission.

It should be noted that, synchronous transmission in the embodiments of this application may be understood as that a plurality of transceiver apparatuses start to transmit respective radio frames at a same moment, and clocks of the plurality of transceiver apparatuses are synchronized. For example, the plurality of transceiver apparatuses include an AP 01 and an AP 02, and clocks of the AP 01 and the AP 02 are synchronized. Synchronous transmission between the AP 01 and the AP 02 means that the AP 01 starts to send a radio frame 01 at a moment A, and the AP 02 also starts to send a radio frame 02 at the moment A.

Aligned transmission in the embodiments of this application may be understood as that a plurality of transceiver apparatuses end transmitting respective radio frames at a same moment, and clocks of the plurality of transceiver apparatuses are synchronized. For example, the plurality of transceiver apparatuses include an AP 03 and an AP 04, and clocks of the AP 03 and the AP 04 are synchronized. Aligned transmission between the AP 03 and the AP 04 means that the AP 03 ends sending a radio frame 03 at a moment B, and the AP 04 also ends sending a radio frame 04 at the moment B.

It may be understood that, synchronous and aligned transmission means that a plurality of transceiver apparatuses start to transmit respective radio frames at a same moment and end transmitting the respective radio frames at a same moment. For example, the plurality of transceiver apparatuses include an AP 01 and an AP 02, and clocks of the AP 01 and the AP 02 are synchronized. Synchronous transmission between the AP 01 and the AP 02 means that the AP 01 starts to send a radio frame 01 at a moment C, and ends sending the radio frame 01 at a moment D; and the AP 02 also starts to send a radio frame 02 at the moment C, and ends sending the radio frame 02 at the moment D.

The foregoing manners are described below with reference to specific embodiments.

Figure 2A:
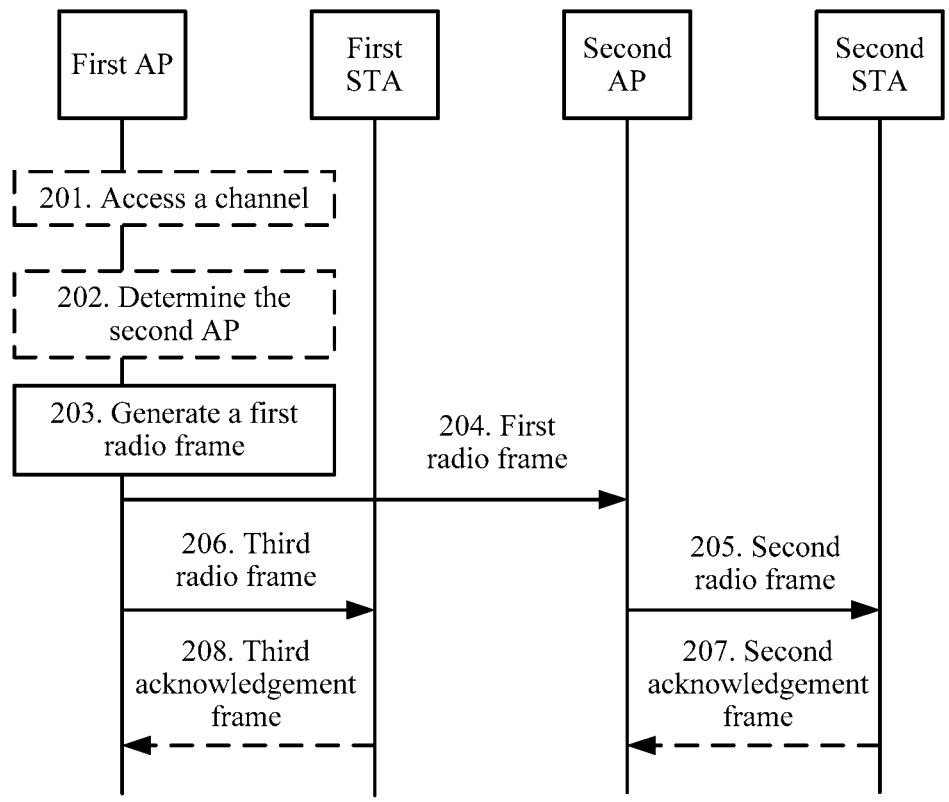
FIG. 2a is an example of a flowchart of a method for coordinated multi-access point AP transmission according to an embodiment of this application.

Referring to FIG. 2*a*, a method embodiment in which coordinated multi-AP transmission is performed by using the method A in the embodiments of this application is described. For ease of understanding, this embodiment may be briefly described with reference to the system framework diagram shown in FIG. 1b. The method may include the following:

An AP 1 sends control information to an AP 2. After receiving the control information, the AP 2 sends data to a STA 2 after specific duration, for example, 4 ms. It should be noted that, when the AP 2 includes a plurality of APs, duration from receiving control information by one AP 2 to sending data by the AP 2 is the same as duration from receiving control information by another AP 2 to sending data by the AP 2, and transmission duration of the sent data is also the same. To be specific, the plurality of APs start to send data at the same time, and transmission duration of the sent data is also the same; therefore, data sending is also ended at the same time, to implement synchronous and aligned transmission of the plurality of APs during downlink transmission. The AP 1 may also be synchronized with a plurality of APs 2.

Descriptions are provided below based on specific steps.

201. A first AP accesses a channel.

In this embodiment, an AP initiating multi-AP coordination is referred to as the first AP, and an AP exchanging control information with the first AP is referred to as a second AP. Because a Wi-Fi frequency band is an unlicensed frequency band, a plurality of APs should access a channel through contention, to send a radio frame. The following two cases may be used for description. In Case 1, an AP is selected as the first AP. In Case 2, any AP may be the first AP.

In an example of Case 1, the selected AP, namely, the first AP successfully obtains a channel through contention, and sends a first radio frame through the channel, where the first radio frame may be used to initiate coordinated multi-AP transmission. In another example, the first AP fails to contend for a channel, and an AP that successfully obtains a channel through contention sends a request frame to the first AP, where the request frame is used to request the first AP to access the channel, and sends a first radio frame through the channel.

In an example of Case 2, any AP can contend for a channel by using a channel access method, and an AP succeeding in the contention is the first AP, to send a first radio frame, thereby triggering coordinated multi-AP transmission. It may be understood that, an AP that obtains a channel through contention is used as the first AP to send the first radio frame.

In this embodiment of this application, an AP may contend for a channel in a plurality of manners. In an example, a channel is contended for based on a channel access method with carrier sense multiple access with collision avoidance (carrier sense multiple access with collision avoidance, CSMA/CA). In another example, the AP may contend for a channel based on a request to send/clear to send (request to send/clear to send, RTS/CTS) channel access mechanism or based on a point coordination mode (point coordination function, PCF). This is not specifically limited herein.

202. The first AP determines a second AP.

When inter-cell interference needs to be reduced through coordination between the plurality of APs, the first AP may determine the second AP participating in coordination. In this embodiment, there are a plurality of bases for the first AP to determine the second AP. In an example, the first AP obtains a received signal strength indication (received signal strength indication, RSSI) of an adjacent AP, and determines, as a second AP, an AP corresponding to an RSSI with a value included in a first value range. The adjacent AP may be understood as an AP that can communicate with the first AP. In another example, the first AP determines a physical distance between the first AP and each of adjacent APs, and selects a second AP from the adjacent APs, so that a value of a physical distance between the first AP and the second AP is within a second value range. In still another example, the first AP may determine a fit AP in adjacent APs as a second AP. The fit AP may be understood as an AP that needs to be managed, commissioned, and controlled by a radio controller in this embodiment, in other words, the fit AP cannot work independently, and needs to be used in cooperation with the radio controller. In still another example, the first AP may determine a second AP based on service requirement information. Therefore, a manner in which the first AP determines the second AP is not specifically limited herein. It may be understood that, the second AP may be one or more APs.

It should be noted that, in actual application, this step is an optional step. To be specific, the first AP may enable all adjacent APs to participate in the coordination.

203. The first AP generates a first radio frame.

The first AP generates the first radio frame. The first radio frame is used to initiate coordinated multi-AP transmission. It should be noted that, to implement synchronous and aligned transmission of the plurality of APs during downlink transmission, the first radio frame includes at least first indication information, and the first indication information is used to indicate transmission duration of a second radio frame to the second AP.

It should be noted that, in this embodiment of this application, transmission duration may be understood as a time from starting to send a radio frame by a transceiver apparatus to completing sending of the radio frame, and the transmission duration is related to a size of the radio frame. In actual application, the transmission duration may alternatively have another name, for example, a transmission latency. This is not specifically limited herein. The transmission duration may be directly indicated by a period of time, or may be indicated by a sending time and an end time of the radio frame. This is not limited herein.

In this embodiment, the first AP generates the first radio frame, so that after receiving the first radio frame, the second AP sends, after first duration, a second radio frame to a second STA associated with the second AP, to implement synchronization of the plurality of APs. The first duration may be a predefined short inter-frame spacing (short inter-frame space, SIFS), or may be defined by the first AP. When the first duration is defined by the first AP, the first radio frame may further include indication information for the first duration.

Optionally, to indicate second APs that participate in the coordinated transmission initiated by the first AP, the first radio frame may further include second indication information, and the second indication information is used to indicate identifier information of the second AP, so that after receiving the first radio frame, the second AP determines, according to the second indication information, whether the second AP needs to participate in the coordinated multi-AP transmission. It should be noted that, in this embodiment, there may be a plurality of cases for the identifier information of the second AP. In an example, the identifier information of the second AP may be a media access control (media access control, MAC) address of the second AP. In another example, the identifier information of the second AP may be a part of a MAC address of the second AP. In still another example, the first AP may assign an address to the second AP, or the second AP determines an address and indicates the address to the first AP, so that the first AP adds the address to the first radio frame, or the identifier information of the second AP is identifier information of a device (which may be a STA or an AP) having a coupling relationship with the second AP, so that after receiving a frame sent by the first AP to the second AP, the device forwards the frame to the second AP through an internal interface between the device and the second AP. Therefore, the identifier information of the second AP is not specifically limited herein.

Optionally, the first AP may further instruct the second AP to sense a channel within the first duration after the second AP receives the first radio frame. After the second AP receives the first radio frame, if the second AP obtains through sensing, within the first duration, that a channel between the second AP and the second STA is in an idle state, the second AP may send the second radio frame to the associated second STA. Otherwise, if the channel between the second AP and the second STA is in an occupied state, the second AP does not send the second radio frame. Therefore, the first radio frame may further include third indication information, and the third indication information is used to indicate whether the second AP needs to sense the channel between the second AP and the second STA before sending the second radio frame to the second STA. In an example, a 1-bit channel sensing (channel sensing, CS) indication field may be set in the first radio frame. For example, when the CS indication field is set to 1, it indicates that the second AP needs to sense a channel, and sends the second radio frame to the second STA only when the channel between the second AP and the second STA is idle. When the CS indication field is set to 0, it indicates that the second AP does not need to sense a channel, to be specific, after receiving the first radio frame, the second AP sends the second radio frame to the second STA after the first duration regardless of whether the channel between the second AP and the second STA is idle.

Optionally, to implement a joint resource management function, the first radio frame may further carry some control information, to help the second AP perform radio resource management. An example is described below.

Because transmission by the first AP and transmission by the second AP are performed on a same channel, to reduce interference of the second AP to a first STA associated with the first AP, the first radio frame may carry fourth indication information, the fourth indication information is used to indicate transmit power information of each second AP, and the transmit power information may be maximum transmit power or transmit power configured by the first AP for the second AP, so that a value of the interference of the second AP to the first STA is within a third value range. The third value range may be predefined.

Optionally, to enable the second AP to predict a value of interference of the first AP to the second STA before sending the second radio frame, the first radio frame may further carry fifth indication information, and the fifth indication information is used to indicate transmit power information of the first AP.

Optionally, to reduce interference of the second STA to the first AP, the first radio frame may carry sixth indication information, and the sixth indication information is used to indicate information about a maximum tolerable interference threshold for the first AP, so that the second AP determines power indication information of each associated second STA based on the sixth indication information. The power indication information may be used by each second STA to determine maximum transmit power. In addition, the power indication information may be included in the second radio frame sent by the second AP to the second STA. In a possible implementation, the information about the maximum tolerable interference threshold may be a value of a spatial reuse parameter (spatial reuse parameter, SRP). The SRP may be used by the second AP to adjust transmit power during spatial reuse transmission. Therefore, the second AP may set a transmission parameter of the associated second STA based on the value of the SRP. Correspondingly, to enable the second AP to predict, before sending the second radio frame, a value of interference of the first STA to the second AP when the second AP receives the radio frame sent by the second STA, the first radio frame may carry seventh indication information and eighth indication information, the seventh indication information is used to indicate identifier information of the first STA, and the eighth indication information is used to indicate transmit power information of the first STA.

Figure 2B:
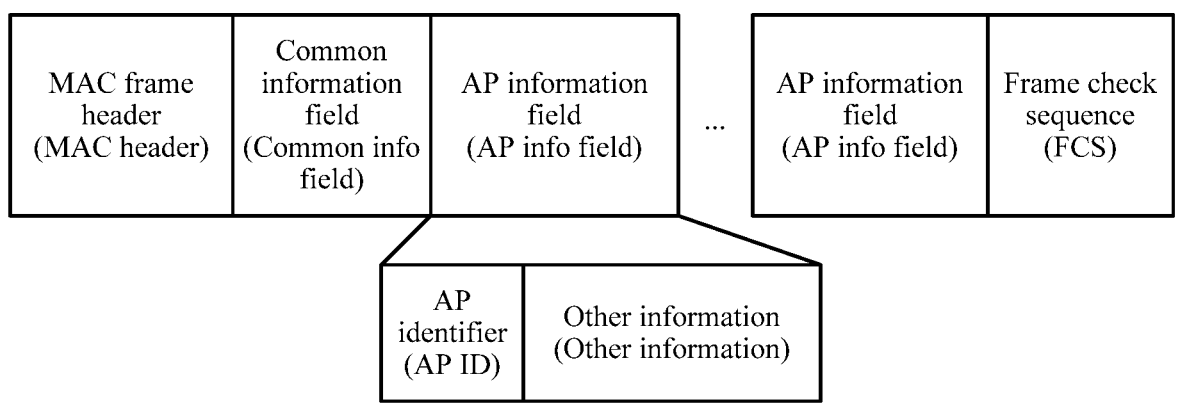
FIG. 2b is an example of a schematic diagram of a frame format of a first radio frame according to an embodiment of this application.
Figure 2C:
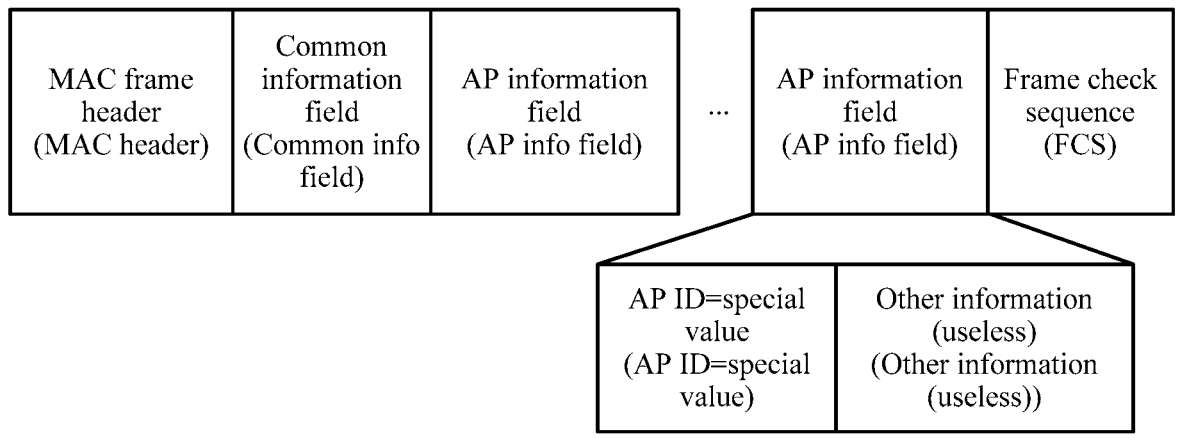
FIG. 2c is another example of a schematic diagram of a frame format of a first radio frame according to an embodiment of this application.

Optionally, to ensure that the second AP has sufficient time to prepare data transmission after receiving the first radio frame, the first radio frame may be extended, so that after obtaining, through decoding, each piece of indication information included in the first radio frame, the second AP has a particular time to prepare data after transmission of the first radio frame ends. In an example, a padding (padding) field is added to the first radio frame, and useless information is padded in the padding field, so that the first radio frame may include ninth indication information for indicating a length of the padding field. For ease of understanding, FIG. 2b is an example of a schematic diagram of a frame format of the first radio frame according to this embodiment of this application. Each AP information field (AP info field) may include an AP ID field and other information (other information) fields after the AP ID field. In an example, an AP info field may be used as a padding field. An AP ID in the padding field may be set as a special AP ID field, for example, all 1s or all 0s, for indicating a start of the padding field. When detecting the special AP ID field, the second AP may determine that following other information fields are padded useless information, so that the second AP can prepare data within duration of receiving the padding field. FIG. 2c is an example of a schematic diagram of a frame format of the first radio frame according to this embodiment. In the figure, an AP info field adjacent to a frame check sequence (frame check sequence, FCS) may be understood as a padding field. An AP ID in the AP info field is equal to a special value, and other information (Other information) fields following the AP ID field in the AP information field include other information fields with useless (useless) information.

Optionally, to better perform radio resource management, the first AP may further perform centralized scheduling, to determine a transmission parameter of the second AP, to be specific, the first AP allocates and indicates resource scheduling information to the second AP. Therefore, the first radio frame may further carry tenth indication information, and the tenth indication information is used to indicate the resource scheduling information, so that the second AP determines, based on the resource scheduling information, a channel resource used to send the second radio frame. The resource scheduling information may include but is not limited to one or a combination of a plurality of the following information: resource block (resource unit, RU) allocation information of each second AP, identifier information (namely, identifier information of the second STA) of a station scheduled by the second AP, a modulation and coding scheme (modulation and coding scheme, MCS) used by each station, or a spatial stream used by each station.

Optionally, because there are different application scenarios in actual application, for example, uplink transmission and downlink transmission, in this embodiment of this application, the first radio frame may include eleventh indication information, and the eleventh indication information is used to instruct to perform uplink transmission or downlink transmission. In an example, a 1-bit uplink/downlink indication field may be set in the first radio frame. For example, when the uplink/downlink indication field is set to 0, it indicates that uplink transmission needs to be performed, to be specific, the second AP triggers the second STA to send a radio frame to the second AP. When the uplink/downlink indication field is set to 1, it indicates that downlink transmission needs to be performed, to be specific, the second AP needs to send a radio frame to the second STA. It should be noted that, in this embodiment, the eleventh indication information is used to instruct to perform downlink transmission.

Optionally, in view of the fact that this application further provides a plurality of coordinated transmission modes, for example, synchronous transmission, aligned transmission, and synchronous and aligned transmission, the first AP may indicate a specific transmission mode to the second AP before the second AP participates in the coordinated transmission. The first AP may have the following indication manner, including:

The first radio frame includes twelfth indication information, and the twelfth indication information is used to indicate whether synchronous transmission is required. In this embodiment, the twelfth indication information is used to indicate that synchronous transmission is required. It should be noted that, if the twelfth indication information indicates that the plurality of APs do not need to perform synchronous transmission, to be specific, second APs do not need to start transmission at the same time, the second APs may independently determine a transmission start time, and the second APs may perform aligned transmission, or may not perform aligned transmission.

Optionally, the first radio frame may further include thirteenth indication information, and the thirteenth indication information is used to indicate whether aligned transmission is required. If the thirteenth indication information indicates that the plurality of APs do not need to perform aligned transmission, to be specific, second APs do not need to end transmission at the same time, and the second APs may independently determine a transmission end time.

In some specific scenarios, if there is a relatively long distance between APs and there is also a relatively long distance between STAs, a case of asynchronous transmission and unaligned transmission may be allowed. In this embodiment, to indicate, to the second AP, the case of asynchronous transmission and unaligned transmission, the first AP may add both the twelfth indication information and the thirteenth indication information to the first radio frame. The twelfth indication information is used to indicate that the plurality of APs do not need to perform synchronous transmission, and the thirteenth indication information is used to indicate that the plurality of APs do not need to perform aligned transmission.

Optionally, the first radio frame includes fourteenth indication information, and the fourteenth indication information is used to indicate a mode for the coordinated multi-AP transmission. In an example, a 2-bit transmission indication field may be set in the first radio frame. For example, when the transmission indication field is 01, it indicates that synchronous transmission is required. When the transmission indication field is 10, it indicates that aligned transmission is required. When the transmission indication field is 00, it indicates asynchronous transmission and unaligned transmission. When the transmission indication field is 11, it indicates synchronous and aligned transmission. Therefore, a specific indication manner is not limited in this application.

Optionally, when the first AP determines asynchronous transmission and unaligned transmission, the first AP may instruct an acknowledgement policy (ACK policy) to be set to a block acknowledgement (block ACK, BA) when the second AP sends the second radio frame to the second STA, so that after receiving the second radio frame, the second STA does not immediately respond to a BA frame, but responds to a BA frame after receiving a block acknowledgement request (block ACK request, BAR) frame sent by the second AP, thereby reducing interference caused by a possible case in which the second STA sends a BA frame while the second AP sends a data frame. For example, the first AP instructs the second AP to send the second radio frame to the second STA, and in a sending period of the second radio frame, the first AP sends a third radio frame to the first STA associated with the first AP, in other words, a sending time of the second radio frame may be different from a sending time of the third radio frame, and an end time of the second radio frame may be different from an end time of the third radio frame, but there may be an intersection of the sending period of the second radio frame and a sending period of the third radio frame. In this embodiment of this application, the sending period may be understood as a corresponding time segment from starting to send a radio frame by a transceiver apparatus to completing sending of the radio frame. For example, the transceiver apparatus starts to send a radio frame at a moment A, and ends sending the radio frame at a moment B, so that a sending period of the radio frame is from the moment A to the moment B. Therefore, for ease of understanding, the sending period of the second radio frame is set to [moment 1, moment 2], the sending period of the third radio frame is set to [moment 3, moment 4], the moment 3 is earlier than the moment 1, and the moment 4 may not be equal to the moment 2. Therefore, there may be an intersection of the sending period of the second radio frame and the sending period of the third radio frame. To avoid a case in which while one AP sends a radio frame, another AP receives an acknowledgement frame, the first AP instructs the second AP to set an ACK policy, so that the second STA does not immediately reply with an acknowledgement frame after receiving the second radio frame, and instead, the second STA sends an acknowledgement frame to the second AP after the second AP sends an acknowledgement frame request to the second STA after sending of the first radio frame and sending of the second radio frame both end.

Therefore, the first radio frame may further carry fifteenth indication information, and the fifteenth indication information is used to instruct to add the ACK policy to the second radio frame.

In conclusion, in addition to the first indication information, the first radio frame may further carry a plurality of pieces of indication information. Details may be shown in Table 1.

TABLE 1

| Indication information | Indication content |
| --- | --- |
| Second indication information | Identifier information of the second AP |
| Third indication information | Whether a channel needs to be sensed |

TABLE 1-continued

| Indication information | Indication content |
| --- | --- |
| Fourth indication information | Transmit power information of the second AP |
| Fifth indication information | Transmit power information of the first AP |
| Sixth indication information | Information about a maximum tolerable interference threshold for the first AP |
| Seventh indication information | Identifier information of the first STA |
| Eighth indication information | Transmit power information of the first STA |
| Ninth indication information | Length of the padding field |
| Tenth indication information | Resource scheduling information |
| Eleventh indication information | Downlink transmission |
| Twelfth indication information | Synchronous transmission is required |
| Thirteenth indication information | Aligned transmission is required |
| Fourteenth indication information | Mode for multi-AP transmission |
| Fifteenth indication information | The second radio frame carries the ACK policy |

For ease of description, in this embodiment, information needing to be indicated by the first AP to the second AP is referred to as to-be-indicated information. The to-be-indicated information includes at least the first indication information, and the to-be-indicated information may further include but is not limited to one or a combination of a plurality of the indication information shown in Table 1. It should be noted that, all of the to-be-indicated information may be included in the first radio frame. For example, if the to-be-indicated information includes the first indication information to the fourth indication information, the first radio frame includes the first indication information to the fourth indication information. In an example, all of information other than the first indication information in the to-be-indicated information may not be included in the first radio frame. For example, if the to-be-indicated information includes the first indication information to the fourth indication information, after determining the second AP participating in the coordinated transmission, the first AP sends a control frame to the second AP. The control frame includes the second indication information and the third indication information. After obtaining a channel through contention, the first AP sends the first radio frame to the second AP to trigger the multi-AP transmission. The first radio frame includes the first indication information and the fourth indication information. Therefore, a manner in which the first AP sends the to-be-indicated information to the second AP is not limited herein.

It should be noted that, in this embodiment, the first AP accesses the channel by using step 201, and determines the second AP and generates the first radio frame by using step 202 and step 203. The steps are not limited to a particular order in the two processes, and step 201 may be performed first, or step 202 and step 203 may be performed first, or the steps are simultaneously performed. This is not specifically limited herein.

204. The second AP receives the first radio frame sent by the first AP.

After accessing the channel, the first AP sends the generated first radio frame to the determined second AP, to initiate the coordinated multi-AP transmission, so that after receiving the first radio frame, the second AP sends, after the first duration, the second radio frame to the second STA associated with the second AP. The transmission duration of the second radio frame is the transmission duration indicated by the first indication information. In addition, the first duration may be duration defined by the first AP, or may be preset duration.

It should be noted that, to improve data transmission efficiency and reduce a bit error rate, in actual application, a transmit end, namely, the first AP in this embodiment may successively perform operations such as encoding, modulation, mapping to a frame, inverse fast Fourier transform, and cyclic prefix (cyclic prefix, CP) adding on the first radio frame, and then transmits the first radio frame to a receive end, namely, the second AP in this application through the channel. Correspondingly, after receiving the first radio frame sent by the first AP, the second AP successively performs CP removal, fast Fourier transform, data extraction, channel estimation, balancing, demodulation, and decoding processing on the received first radio frame. In this application, a decoding operation may be performed on the encoded first radio frame through existing technical means. Details are not described in this application.

In addition, as described in step 203, the first radio frame may include a plurality of types of indication information, and the second AP participates in the coordinated multi-AP transmission according to each piece of indication information in the first radio frame. Details are as follows:

The second AP determines, according to the first indication information, the transmission duration of the second radio frame sent to the second STA.

Optionally, when the first radio frame includes the second indication information, the second AP determines, according to the second indication information, to participate in the coordinated multi-AP transmission initiated by the first AP.

Optionally, when the first radio frame includes the third indication information, the second AP determines, according to the third indication information, whether the second AP needs to sense the channel between the second AP and the second STA before sending the second radio frame. If the third indication information indicates that the channel needs to be sensed, the second AP determines, based on a status of the channel that is obtained through sensing, whether to send the second radio frame, to be specific, does not send the second radio frame when the channel is busy; otherwise, sends the second radio frame. If the third indication information indicates that the channel does not need to be sensed, after receiving the first radio frame, the second AP directly sends the second radio frame to the second STA after the first duration.

Optionally, when the first radio frame includes the fourth indication information, the second AP determines the transmit power information of the second AP according to the fourth indication information. The transmit power information may be maximum transmit power or transmit power configured by the first AP. Therefore, in this embodiment, when the second AP sends the second radio frame, used transmit power does not exceed the maximum transmit power; or used transmit power is the transmit power configured by the first AP.

Optionally, when the first radio frame includes the fifth indication information, the second AP obtains the transmit power information of the first AP according to the fifth indication information, so that the second AP predicts the value of the interference of the first AP to the associated second STA based on the transmit power information of the first AP. In actual application, the following formula may be used for prediction: value of the interference of the first AP to the second STA=transmit power of the first AP-value of a path loss from the first AP to the second STA. It may be understood that, in actual application, another manner may be used for prediction. This is not specifically limited herein.

Optionally, when the first radio frame includes the sixth indication information, the second AP obtains the information about the maximum tolerable interference threshold for the first AP according to the sixth indication information, and determines power indication information of each second STA based on the information about the maximum interference threshold, so that each second STA determines the maximum transmit power of the second STA according to the power indication information, to be specific, transmit power of each second STA is controlled, so that the value of the interference of the second STA to the first AP is within a fourth value range. Therefore, in this embodiment, transmit power used when the second STA sends a BA in response to the second radio frame cannot exceed the maximum transmit power of the second STA. In an example, the second AP may determine an average value of interference of each second STA to the first AP based on the information about the maximum interference threshold. For example, a value of the information about the maximum tolerable interference threshold for the first AP is 5 mw, and the second AP is associated with five second STAs, so that the second AP may assume that the average value of the interference of each second STA to the first AP cannot be greater than 5 mw/5=1 mv, and then the second AP can determine the maximum transmit power of the second STA based on the average value of the interference of each second STA to the first AP. It should be noted that, in this application, in an optional manner, the second AP may directly predict the maximum transmit power of the second STA, and indicate the maximum transmit power to the second STA. In another optional manner, the second AP may indicate, to the second STA, the power indication information, for example, a maximum value of the interference of the second STA to the first AP, so that the second STA determines the maximum transmit power of the second STA according to the power indication information. To be specific, the second STA may directly obtain the maximum transmit power of the second STA by using the power indication information sent by the second AP, or may further calculate the maximum transmit power of the second STA according to the power indication information.

Optionally, when the first radio frame includes the seventh indication information and the eighth indication information, the second AP determines a value of interference of each first STA to the second AP based on the identifier information of the first STA in the seventh indication information and transmit power of the first STA in the eighth indication information.

Optionally, when the first radio frame includes the ninth indication information, the second AP determines, by using the ninth indication information, the length of the padding field for padding useless information. To be specific, the second AP may prepare, within the length of the padding field, data to be sent to the second STA. In another example, the first radio frame may further include a special AP ID field for indicating a start of the padding field. When the second AP detects the special AP ID field, the second AP can prepare, within duration of the padding field, data to be sent to the second STA.

Optionally, when the first radio frame includes the tenth indication information, the second AP determines, by using the resource scheduling information indicated by the tenth indication information, the channel resource used to send the second radio frame. The resource scheduling information may include but is not limited to one or a combination of a plurality of the following information: the resource block (resource unit, RU) allocation information of each second AP, the identifier information (namely, the identifier information of the second STA) of the station scheduled by the second AP, the MCS used by each station, or the spatial stream used by each station.

Optionally, when the first radio frame includes the eleventh indication information, the second AP determines, by using the eleventh indication information, to perform uplink transmission or downlink transmission. In this embodiment, the eleventh indication information is used to instruct to perform downlink transmission, to be specific, trigger the second AP to send the second radio frame to the second STA. The second radio frame may be a data frame or a control frame.

Optionally, when the first radio frame includes the twelfth indication information, the second AP determines, by using the twelfth indication information, whether synchronous transmission is required. In this embodiment, the twelfth indication information is used to indicate that synchronous transmission needs to be performed. To be specific, after receiving the first radio frame, each second AP sends the second radio frame to the second STA after preset duration, thereby implementing synchronous transmission of the plurality of APs.

Optionally, when the first radio frame includes the thirteenth indication information, the second AP determines, by using the twelfth indication information, whether aligned transmission is required. In this embodiment, the thirteenth indication information is used to indicate that aligned transmission needs to be performed.

Optionally, when the first radio frame includes the fourteenth indication information, the second AP may determine the mode for coordinated multi-AP transmission by using the fourteenth indication information. In this embodiment, the fourteenth indication information is used to instruct to perform synchronous and aligned transmission.

Optionally, when the thirteenth indication information indicates that aligned transmission is not required or the fourteenth indication information indicates asynchronous transmission and unaligned transmission, the first radio frame may further include the fifteenth indication information, and the second AP adds the ACK policy to the second radio frame by using the fifteenth indication information, so that after receiving the second radio frame, the second STA does not immediately respond to the BA frame, and instead, responds to the BA frame after receiving the BAR frame sent by the second AP.

Optionally, after receiving the first radio frame sent by the first AP, the second AP further sends a first acknowledgement frame in response to the first radio frame to the first AP. It should be noted that, when there are a plurality of second APs, there are also a plurality of corresponding first acknowledgement frames. Therefore, to implement synchronous and aligned transmission of the plurality of first acknowledgement frames, the first radio frame may further include transmission duration of the first acknowledgement frame, so that after receiving the first radio frame, the plurality of second APs send the first acknowledgement frames to the first AP after same duration.

205. The second AP sends the second radio frame to the second STA.

In this embodiment, after receiving the first radio frame, the second AP sends the second radio frame to the second STA after the first duration.

For a manner in which the second AP sends the second radio frame to the second STA based on each piece of indication information included in the first radio frame, refer to the descriptions of step 204. Details are not described herein again.

206. The first AP sends the third radio frame to the first STA.

After sending the first radio frame to the second AP, the first AP sends, in the sending period of the second radio frame, the third radio frame to the first STA associated with the first AP. In addition, to align sending of downlink frames by the plurality of APs, transmission duration of the third radio frame is equal to the transmission duration of the second radio frame. In this embodiment, to synchronize sending of the downlink frames by the plurality of APs, after sending the first radio frame, the first AP also sends the third radio frame to the first STA after the first duration, in other words, the sending time of the third radio frame is the same as the sending time of the second radio frame, to synchronize the second radio frame and the third radio frame.

Optionally, the third radio frame may also include an ACK policy, so that after receiving the second radio frame, the first STA does not immediately respond to a third acknowledgement frame that may be understood as a BA, and instead, responds to the third acknowledgement frame after receiving a BAR frame sent by the first AP.

It should be noted that, in this embodiment, this step is an optional step. To be specific, the first AP may not send the third radio frame to the first STA, but merely triggers the plurality of second APs to send second radio frames to the second STA, thereby implementing synchronous and aligned transmission of the plurality of second APs.

For ease of understanding, two cases are separately described below based on figures:

1. The first AP sends the third radio frame to the first STA.

Figure 2D:
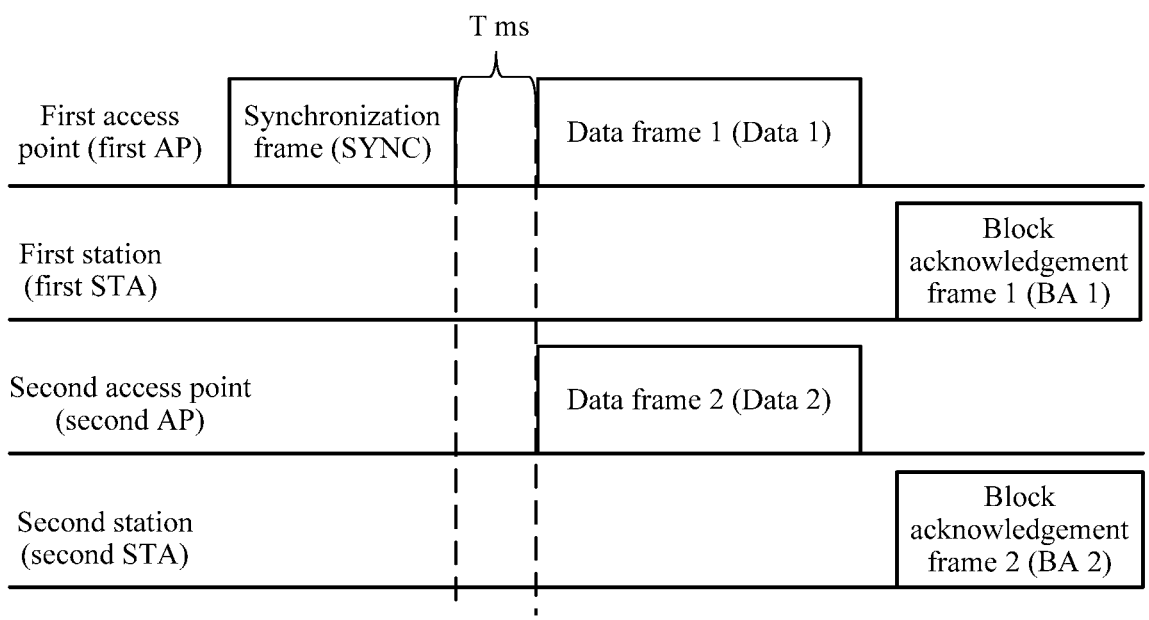
FIG. 2d is an example of a schematic diagram of synchronous and aligned transmission according to an embodiment of this application.

FIG. 2d is a schematic diagram of synchronous transmission according to this embodiment. In FIG. 2d, after sending the first radio frame, namely, a SYNC frame in the figure to the second AP, the first AP sends the third radio frame, namely, data 1 in the figure to the first STA after T ms. Optionally, the first AP then receives a third acknowledgement frame, namely, a BA 1 in the figure that is sent by the first STA and that is used to respond to the third radio frame. After receiving the SYNC frame, the second AP sends the second radio frame, namely, data 2 in the figure to the second STA after T ms, and receives a second acknowledgement frame, namely, a BA 2 in the figure that is sent by the second STA and that is used to respond to the second radio frame. It may be understood that, because the data 1 and the data 2 have a same transmission start time, and the data 1 and the data 2 have same transmission duration, the data 1 and the data 2 also have a same transmission end time, thereby implementing synchronous and aligned transmission of the plurality of APs.

2. The first AP does not send the third radio frame to the first STA.

Figure 2E:
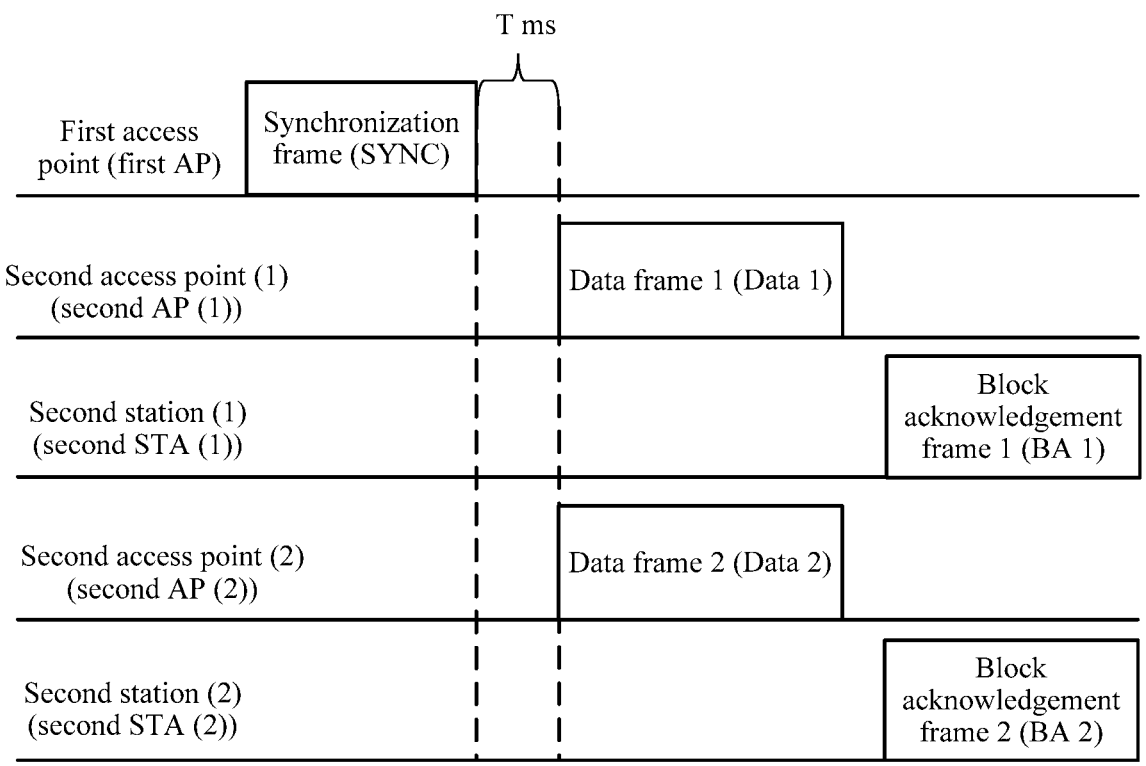
FIG. 2e is another example of a schematic diagram of synchronous and aligned transmission according to an embodiment of this application.

FIG. 2e is another schematic diagram of synchronous transmission according to this embodiment. In FIG. 2e, after sending the first radio frame, namely, a SYNC frame in the figure to the second AP, the first AP does not send a radio frame. After receiving the SYNC frame, a second AP (1) sends a second radio frame, namely, data 1 in the figure to a second STA (1) after T ms, and receives a second acknowledgement frame, namely, a BA 1 in the figure that is sent by the second STA (1). After receiving the SYNC frame, a second AP (2) also sends data 2 to a second STA (2) after T ms, and receives a BA 2 sent by the second STA (2). It may be understood that, because the data 1 and the data 2 have a same transmission start time, and the data 1 and the data 2 have same transmission duration, the data 1 and the data 2 also have a same transmission end time, thereby implementing synchronous and aligned transmission of the plurality of APs.

207. The second STA sends a second acknowledgement frame to the second AP.

After receiving the second radio frame sent by the second AP, the second STA sends the second acknowledgement frame in response to the second radio frame to the second AP.

Optionally, when the second radio frame includes power indication information of the second STA, the second STA determines maximum transmit power of the second STA according to the power indication information, and transmit power used when the second STA sends the second acknowledgement frame cannot be greater than the maximum transmit power.

Optionally, when the second radio frame includes an ACK policy, the second STA sends the second acknowledgement frame to the second AP only after receiving the BAR frame sent by the second AP.

It should be noted that, in actual application, this step is an optional step. To be specific, the second STA may not send the second acknowledgement frame after receiving the second radio frame.

208. The first STA sends a third acknowledgement frame to the first AP.

Optionally, after receiving the third radio frame sent by the first AP, the first STA sends the third acknowledgement frame in response to the third radio frame to the first AP.

Optionally, when the third radio frame includes an ACK policy, the first STA sends the third acknowledgement frame to the first AP only after receiving the BAR frame sent by the first AP.

It should be noted that, in this embodiment, in addition to implementing synchronous and aligned transmission of downlink radio frames, synchronous and aligned transmission of uplink acknowledgement frames can be further implemented. For example, synchronous and aligned transmission of the second acknowledgement frame and the third acknowledgement frame is implemented. For another example, when the first AP does not send the third radio frame or when the first AP sends the third radio frame but the first STA does not send the third acknowledgement frame, synchronous and aligned transmission of a plurality of second acknowledgement frames is implemented. Details are as follows:

The first radio frame may further include transmission duration of the second acknowledgement frame, so that after obtaining the transmission duration of the second acknowledgement frame, the second AP may indicate the transmission duration of the second acknowledgement frame to the second STA by using the second radio frame, and after receiving the second radio frame, the second STA sends the second acknowledgement frame to the second AP after second duration. It should be noted that, similar to the first duration, the second duration may be preset or defined by the first AP. Therefore, the second duration may be the same as or different from the first duration. This is not specifically limited herein.

Optionally, when the first AP sends the third radio frame, the third radio frame may include transmission duration of the third acknowledgement frame, so that after receiving the third radio frame, the first STA sends the third acknowledgement frame to the first AP after the second duration. In addition, it should be noted that, the transmission duration of the third acknowledgement frame is equal to the transmission duration of the second acknowledgement frame.

In conclusion, in this embodiment, synchronous and aligned transmission of acknowledgement frames can be implemented, and a case in which while one STA sends an acknowledgement frame, another STA receives a data frame or a control frame sent by an AP is avoided, thereby reducing interference between the STAs and the APs.

Figures 1, 2F:
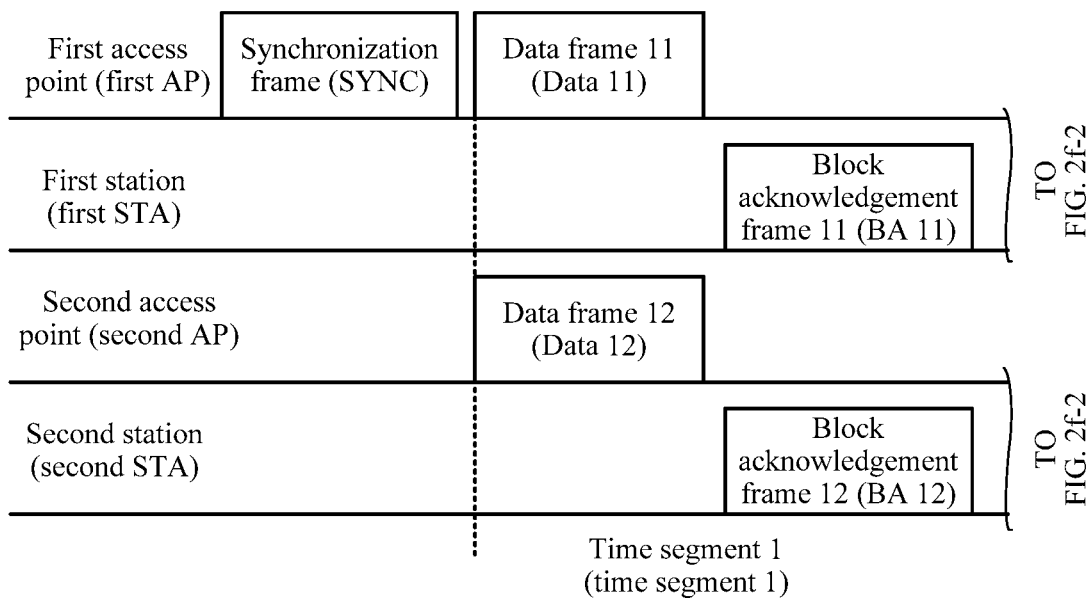
FIG. 2f-1 and FIG. 2f-2 are an example of a schematic diagram of transmission according to an embodiment of this application.
Figures 2, 2F:
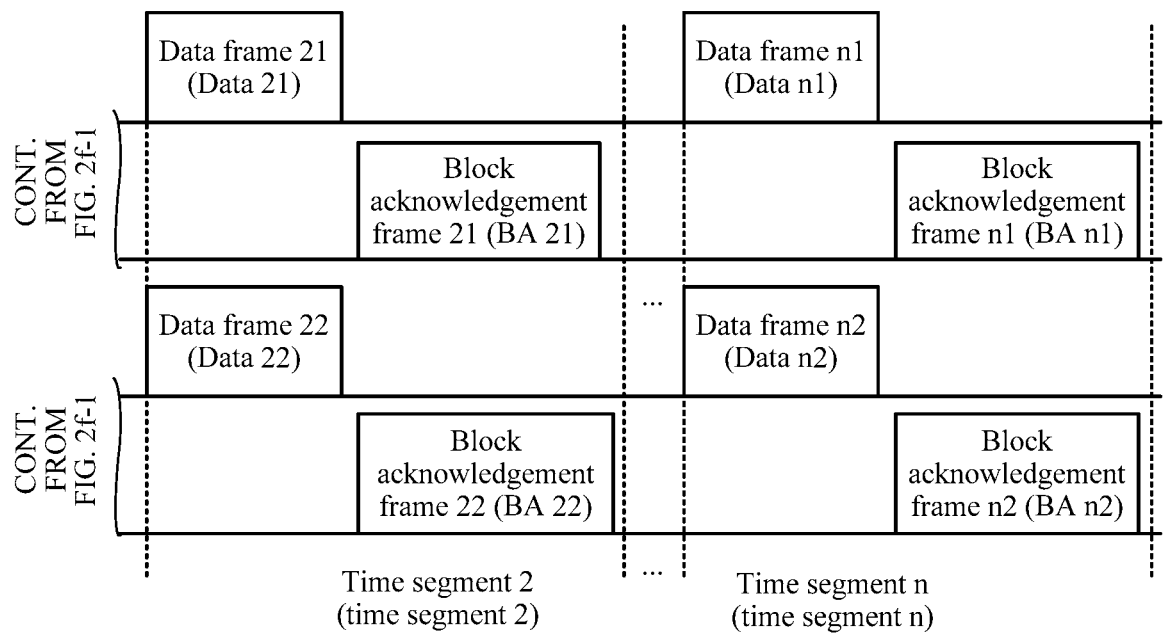

It should be noted that, in this embodiment of this application, sending a radio frame once and receiving an acknowledgement frame in response to the radio frame may be referred to as one transmission. In addition, in this embodiment, the first radio frame can trigger not only one synchronous and aligned transmission but also a plurality of synchronous and aligned transmissions. FIG. 2f-1 and FIG. 2f-2 are an example of a schematic diagram of transmission according to this embodiment. A plurality of synchronous and aligned transmissions are implemented by using the first radio frame. A time occupied by each transmission may be referred to as a time segment (TS, time segment), and the first radio frame may include indication information for each time segment. It may be understood that, the indication information for each time segment may include the first indication information and one or a combination of a plurality of the second indication information to the sixteenth indication information. In an example, the indication information for the time segments may be different. For example, transmission duration of data 11 in a time segment 1 is different from transmission duration of data 21 in a time segment 2. Alternatively, the indication information for the time segments may be the same. For example, the first radio frame may include period indication information, so that the plurality of APs perform synchronous and aligned transmission by using same indication information every one time segment.

In this embodiment of this application, the plurality of APs coordinate scheduled sending procedures and signaling, to implement coordinated multi-AP parallel synchronous downlink transmission, thereby reducing interference and increasing a throughput.

Figure 3A:
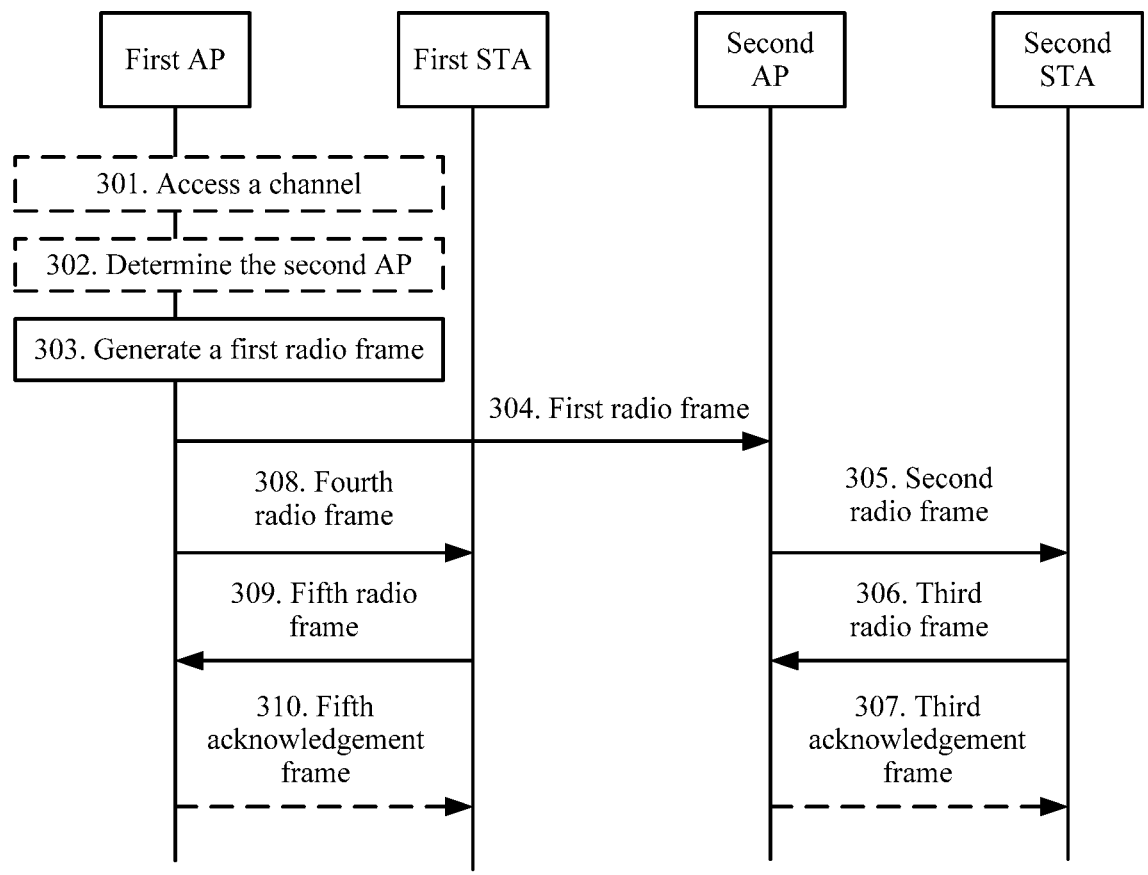
FIG. 3a is an example of a flowchart of a method for coordinated multi-AP transmission according to an embodiment of this application.

Downlink synchronous transmission is described in FIG. 2a above. Referring to FIG. 3a, a method embodiment in which multi-AP coordination is performed by using the method B to implement uplink synchronous and aligned transmission in this application is described below. For ease of understanding, this embodiment may be briefly described with reference to the system framework diagram shown in FIG. 1b. The method may include the following:

An AP 1 sends control information to an AP 2. After receiving the control information, the AP 2 sends trigger information to a STA 2 after duration A. After receiving the trigger information, the STA 2 sends data to the AP 2 after duration B. It should be noted that, when the AP 2 includes a plurality of APs, there may also be a plurality of associated STAs 2. Duration from receiving control information by each AP 2 to sending trigger information is the duration A, and the trigger information sent by the APs 2 also has same transmission duration. Therefore, the STAs 2 also receive the trigger information at a same moment. In addition, duration from receiving the trigger information by each STA 2 to sending data is the duration B, and the data sent by the STAs 2 also has same transmission duration. Therefore, the STAs 2 also end sending the data at the same time. Therefore, a plurality of STAs 2 may simultaneously start to transmit data, and simultaneously end transmitting the data, to implement synchronous transmission of the plurality of STAs during uplink transmission. A STA 1 may alternatively receive trigger information from the AP 1, to synchronize with the plurality of APs 2.

Descriptions are provided below based on specific steps.

301. A first AP accesses a channel.

302. The first AP determines a second AP.

In this embodiment, step 301 and step 302 are similar to step 201 and step 202 shown in FIG. 2a. Details are not described herein again.

303. The first AP generates a first radio frame.

In this embodiment, to implement synchronous transmission of uplink data, the first AP generates the first radio frame, so that after receiving the first radio frame, the second AP sends a second radio frame to a second STA after first duration. The second radio frame triggers the second STA to send, after receiving the second radio frame, a third radio frame to the second AP after second duration. In this embodiment, the second radio frame may be a trigger (trigger) frame, and the third radio frame may be a data frame sent by the second STA. It should be noted that, the first duration and the second duration may be both preset, or both defined by the first AP. When the first duration and the second duration are defined by the first AP, the first radio frame may further include indication information for the first duration and indication information for the second duration. Therefore, the second duration may be the same as or different from the first duration. This is not specifically limited herein.

To coordinate uplink synchronous and aligned transmission of a plurality of APs, the first radio frame includes at least first indication information and sixteenth indication information, the first indication information is used to indicate transmission duration of the second radio frame, and the first indication information is similar to the first indication information included in the first radio frame in FIG. 2a. Details are not described herein again. In addition, the sixteenth indication information is used to indicate transmission duration of the third radio frame sent by the second STA. It may be understood that, to indicate the transmission duration of the third radio frame to the second STA, the second radio frame sent by the second AP to the second STA may also include the transmission duration of the third radio frame.

Similar to the first radio frame generated in step 203 shown in FIG. 2a, in this embodiment, the first radio frame generated by using step 303 may also include but is not limited to one or a combination of a plurality of indication information shown in Table 2:

TABLE 2

| Indication information | Indication content |
| --- | --- |
| Second indication information | Identifier information of the second AP |
| Third indication information | Whether a channel needs to be sensed |
| Fourth indication information | Transmit power information of the second AP |
| Fifth indication information | Transmit power information of the first AP |
| Sixth indication information | Information about a maximum tolerable interference threshold for the first AP |
| Seventh indication information | Identifier information of a first STA |
| Eighth indication information | Transmit power information of the first STA |
| Eleventh indication information | Uplink transmission |

TABLE 2-continued

| Indication information | Indication content |
| --- | --- |
| Twelfth indication information | Synchronous transmission is required |
| Thirteenth indication information | Aligned transmission is required |
| Fourteenth indication information | Mode for multi-AP transmission |
| Fifteenth indication information | Carrying an ACK policy |

The second indication information to the eighth indication information are similar to the second indication information to the eighth indication information that are included in the first radio frame in FIG. 2a. Details are not described herein again.

The eleventh indication information is used to instruct the second AP to perform uplink transmission, to be specific, the second STA needs to be triggered to send the third radio frame to the second AP.

The twelfth indication information to the fourteenth indication information are similar to the twelfth indication information to the fourteenth indication information that are included in the first radio frame in FIG. 2a. Details are not described herein again.

When the first AP determines asynchronous transmission and unaligned transmission, the fifteenth indication information is used to indicate an ACK policy, to be specific, the second AP does not immediately respond to an acknowledgement frame after receiving the third radio frame, but responds to the acknowledgement frame after receiving a BAR frame sent by the second STA.

It should be noted that, in this embodiment, the first AP accesses the channel by using step 301, and determines the second AP and generates the first radio frame by using step 302 and step 303. The steps are not limited to a particular order in the two processes, and step 301 may be performed first, or step 302 and step 303 may be performed first, or the steps are simultaneously performed. This is not specifically limited herein.

304. The second AP receives the first radio frame sent by the first AP.

In this embodiment, step 304 is similar to step 204 in the embodiment shown in FIG. 2a. Details are not described herein again.

305. The second AP sends the second radio frame to the second STA.

In this embodiment, step 305 is similar to step 205 in the embodiment shown in FIG. 2a. Details are not described herein again.

It should be noted that, in this embodiment, the second radio frame is used to trigger the second STA to send the third radio frame to the second AP, and the second radio frame may include the transmission duration of the third radio frame. In the embodiment shown in FIG. 2a, the second STA may be a data frame sent by the second AP to the second STA.

306. The second STA sends the third radio frame to the second AP.

After receiving the second radio frame sent by the second AP, the second STA sends the third radio frame to the second AP after the second duration. The second duration may be an SIFS.

Optionally, when the second radio frame includes power indication information of the second STA, the second STA determines maximum transmit power of the second STA according to the power indication information, and power used when the second STA sends the third radio frame cannot be greater than the maximum transmit power.

307. The second AP sends a third acknowledgement frame to the second STA.

After receiving the third radio frame sent by the second STA, the second AP sends a third acknowledgement frame in response to the third radio frame to the second STA.

Optionally, when the first radio frame includes an ACK policy, the second AP sends the third acknowledgement frame to the second STA only after receiving a BAR frame sent by the second STA.

Optionally, when the first radio frame includes the fifth indication information for indicating the transmit power information of the second AP, and the transmit power information may be maximum transmit power or transmit power configured by the first AP, when the second AP sends the third acknowledgement frame, used power cannot exceed the maximum transmit power of the second AP, or used power is the transmit power configured by the first AP.

It should be noted that, this step is an optional step. To be specific, in actual application, after receiving the third radio frame sent by the second STA, the second AP may not send the third acknowledgement frame in response to the third radio frame to the second STA.

308. The first AP sends a fourth radio frame to the first STA.

After sending the first radio frame to the second AP, the first AP sends, in a sending period of the second radio frame, the fourth radio frame to the first STA associated with the first AP. The fourth radio frame is used to trigger the first STA to send, after receiving the fourth radio frame, a fifth radio frame to the first AP after the second duration, and the fourth radio frame needs to include transmission duration of the fifth radio frame. In addition, to align sending of uplink frames by a plurality of STAs, transmission duration of the fourth radio frame is equal to the transmission duration of the second radio frame, and the transmission duration of the fifth radio frame is equal to the transmission duration of the third radio frame.

It should be noted that, in this embodiment, to synchronize the fourth radio frame and the second radio frame, the first AP sends the fourth radio frame to the first STA in the sending period of the second radio frame, to be specific, after sending the first radio frame, the first AP also sends the fourth radio frame to the first STA after the first duration, so that a sending time of the fourth radio frame is the same as a sending time of the second radio frame.

It should be noted that, this step is similar to step 206 shown in FIG. 2a. Details are not described herein again.

For ease of understanding, two cases are separately described below based on figures:

1. The first AP sends the fourth radio frame to the first STA.

Figure 3B:
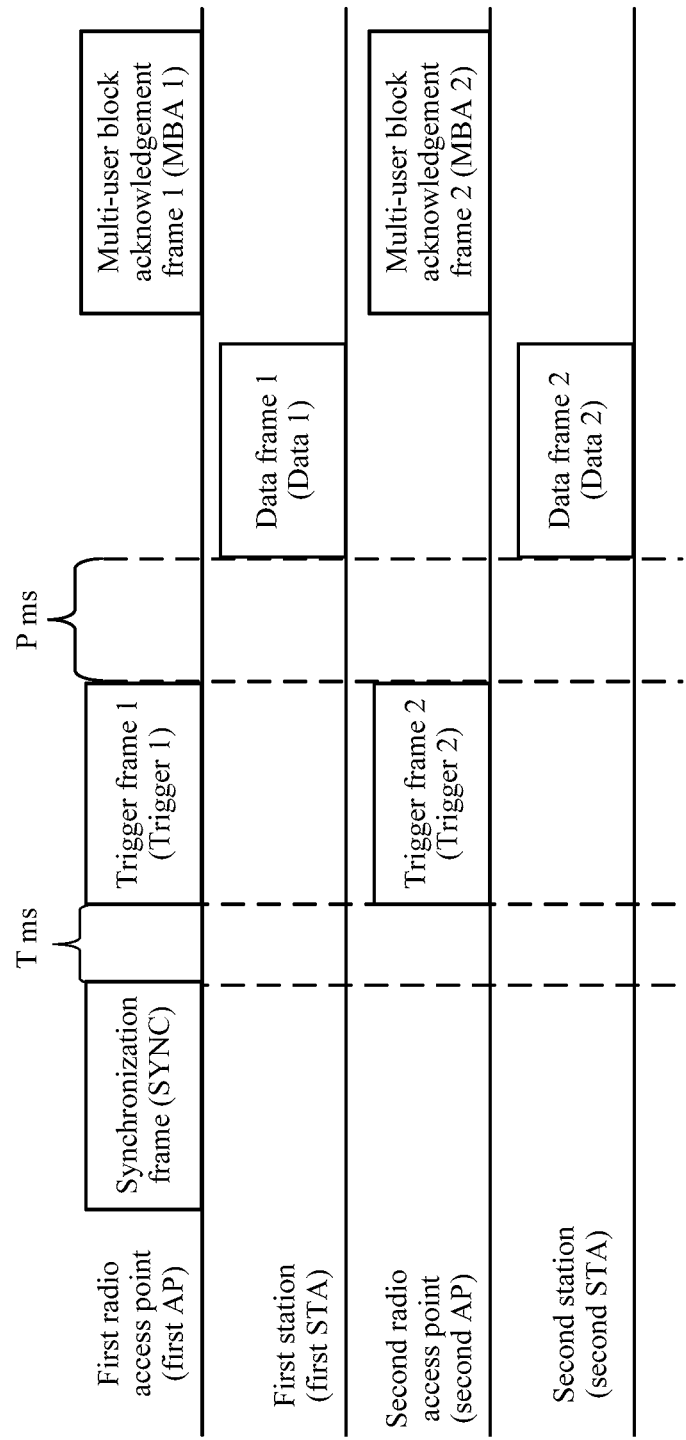
FIG. 3b is another example of a schematic diagram of synchronous and aligned transmission according to an embodiment of this application.

FIG. 3b is another schematic diagram of synchronous and aligned transmission according to this embodiment. In FIG. 3b, after sending the first radio frame, namely, a SYNC frame in the figure to the second AP, the first AP sends the fourth radio frame, namely, a trigger frame 1 in the figure, to the first STA after T ms, and receives the fifth radio frame, namely, data 1 in the figure that is sent by the first STA after P ms. After receiving the SYNC frame, the second AP sends the second radio frame, namely, trigger 2 in the figure to the second STA after T ms, and receives the third radio frame, namely, data 2 in the figure that is sent by the second STA after P ms. It may be understood that, because the data 1 and the data 2 have a same transmission start time, and the data 1 and the data 2 have same transmission duration, the data 1 and the data 2 also have a same transmission end time, thereby implementing synchronous transmission of uplink data.

2. The first AP does not send the fourth radio frame to the first STA.

Figure 3C:
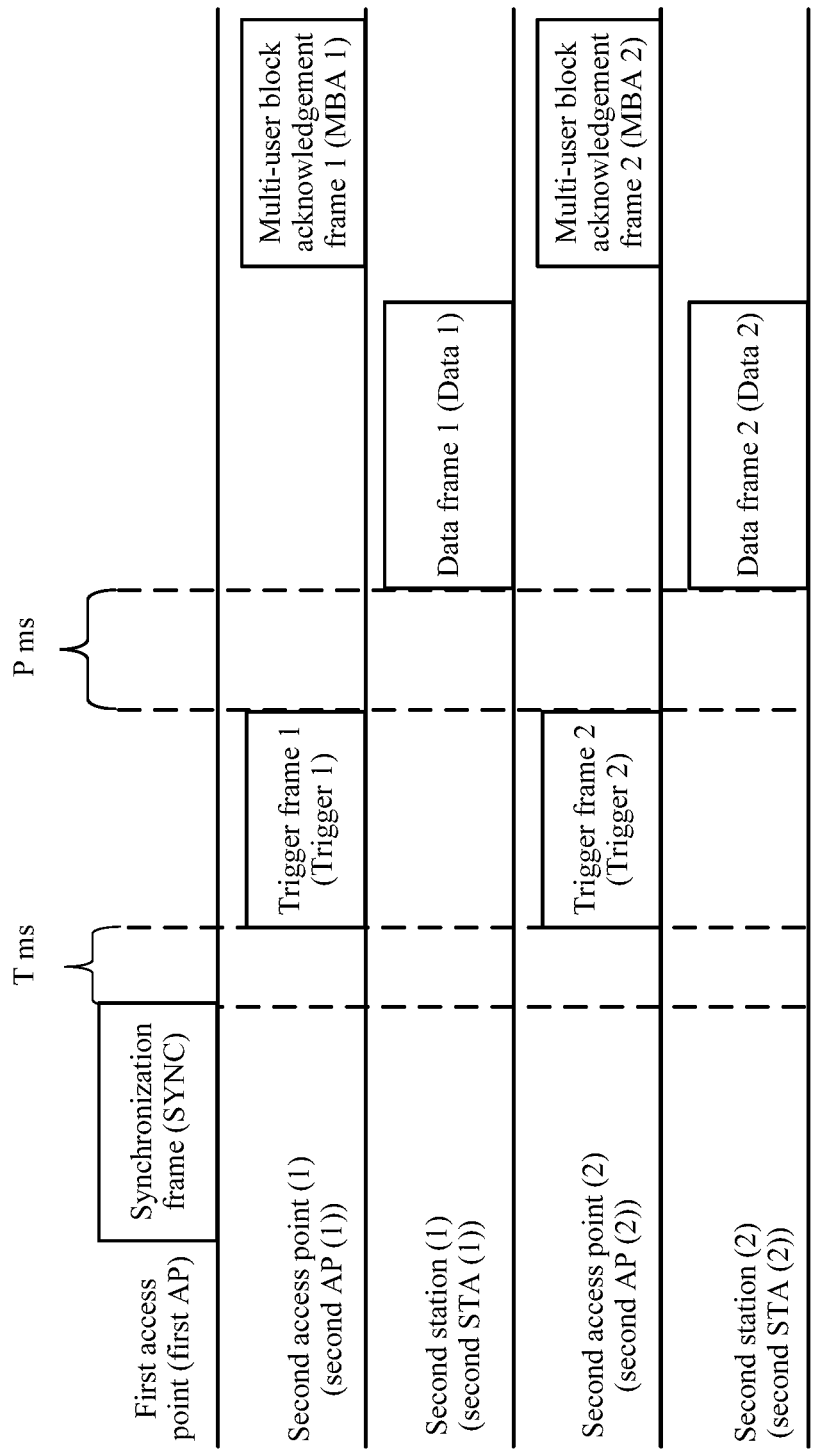
FIG. 3c is another example of a schematic diagram of synchronous and aligned transmission according to an embodiment of this application.

FIG. 3c is another example of a schematic diagram of synchronous and aligned transmission according to this embodiment. In FIG. 3c, after sending the first radio frame, namely, a SYNC frame in the figure to the second AP, the first AP does not send a radio frame. After receiving the SYNC frame, a second AP (1) sends a second radio frame, namely, trigger 1 in the figure to a second STA (1) after T ms, and receives a third radio frame, namely, data 1 in the figure that is sent by the second STA (1) after P ms. After receiving the SYNC frame, a second AP (2) also sends trigger 2 to a second STA (2) after T ms, and receives data 1 that is sent by the second STA (2) after P ms. It may be understood that, because the data 1 and the data 2 have a same transmission start time, and the data 1 and the data 2 have same transmission duration, the data 1 and the data 2 also have a same transmission end time, thereby implementing synchronous and aligned transmission of uplink data.

309. The first STA sends the fifth radio frame to the first AP.

Optionally, after receiving the fourth radio frame sent by the first AP, the first STA sends the fifth radio frame to the second AP after the second duration.

310. The first AP sends a fifth acknowledgement frame to the first STA.

Optionally, after receiving the fifth radio frame sent by the first STA, the first AP may send the fifth acknowledgement frame in response to the fifth radio frame to the first STA.

Optionally, the first AP may set an ACK policy, so that the first AP sends the fifth acknowledgement frame to the first STA only after receiving a BAR frame sent by the first STA.

It should be noted that, in this embodiment, in addition to implementing synchronous and aligned transmission of uplink radio frames, synchronous and aligned transmission of downlink acknowledgement frames can be further implemented, to be specific, synchronous and aligned transmission of the third acknowledgement frame and the fifth acknowledgement frame or synchronous and aligned transmission of a plurality of third acknowledgement frames is implemented. Details are as follows:

The first radio frame may further include the fifteenth indication information, and the fifteenth indication information is used to indicate transmission duration of the third acknowledgement frame, so that after receiving the third radio frame, the second AP sends the third acknowledgement frame to the second STA after third duration. It should be noted that, the third duration may be preset duration or may be defined by the first AP. If the third duration is defined by the first AP, the first radio frame may further include indication information for the third duration.

Optionally, after receiving the fifth radio frame, the first AP also sends the fifth acknowledgement frame to the first STA after the third duration. In addition, it should be noted that, transmission duration of the fifth acknowledgement frame is equal to the transmission duration of the third acknowledgement frame.

In conclusion, in this embodiment, synchronous and aligned transmission of acknowledgement frames of the first AP and the second AP can be implemented, and a case in which while one AP sends an acknowledgement frame, another AP receives a data frame sent by a STA is avoided, thereby reducing interference between the APs and the STAs.

Similar to the first radio frame in the embodiment shown in FIG. 2a, the first radio frame in this embodiment may also trigger a plurality of synchronous transmissions, and a trigger manner is similar to a trigger manner of the first radio frame in the embodiment shown in FIG. 2a. Details are not described herein again.

In this embodiment of this application, the plurality of APs coordinate scheduled sending procedures and signaling, to implement synchronous transmission of uplink data, thereby reducing interference and increasing a throughput.

Figure 4A:
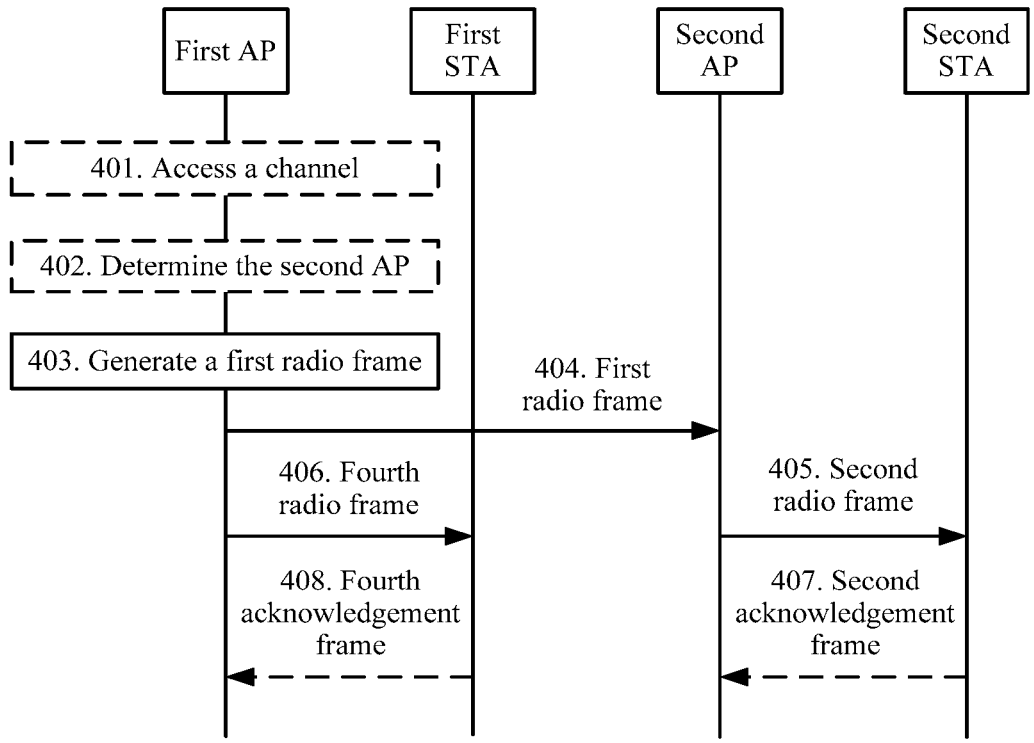
FIG. 4a is an example of a flowchart of a method for coordinated multi-AP transmission according to an embodiment of this application.

Synchronous and aligned transmission is described in FIG. 2a and FIG. 3a above. Referring to FIG. 4a, a method embodiment in which multi-AP coordination is performed by using the method C to implement downlink aligned transmission in this application is described below. For ease of understanding, this embodiment may be briefly described with reference to the system framework diagram shown in FIG. 1b. The method includes the following:

An AP 1 sends control information to an AP 2. After receiving the control information, the AP 2 sends data to a STA 2, and ends sending the data at a moment C. It should be noted that, when the AP 2 includes a plurality of APs, moments at which the APs 2 end sending data to associated STAs 2 are all the moment C. To be specific, the plurality of APs may end sending the data at the same moment, to implement aligned transmission of the plurality of APs during downlink transmission. The AP 1 may also be aligned with the AP 2.

Descriptions are provided below based on specific steps.

401. A first AP accesses a channel.

402. The first AP determines a second AP.

In this embodiment, step 401 and step 402 are similar to step 201 and step 202 shown in FIG. 2a. Details are not described herein again.

403. The first AP generates a first radio frame.

The first AP generates the first radio frame. The first radio frame is used to trigger the second AP to send a second radio frame to a second STA associated with the second AP, to initiate coordinated multi-AP scheduling. It should be noted that, to align a plurality of APs during downlink transmission, the first radio frame includes at least first indication information, and the first indication information is used by the second AP to determine a transmission end time of the second radio frame.

It should be noted that, if radio frames sent by the first AP are different, the first radio frame may also include different first indication information. Descriptions are separately provided below:

Scenario 1: The first AP sends the first radio frame to the second AP and a first STA.

Figure 4B:
FIG. 4b is an example of a schematic diagram of downlink aligned transmission according to an embodiment of this application.

For ease of understanding, FIG. 4b is an example of a schematic diagram of downlink aligned transmission based on Scenario 1 according to this embodiment. In the figure, the first AP sends the first radio frame, namely, data 1 in the figure to the first STA. The data 1 carries the first indication information, and the first indication information may be used to indicate transmission duration of the data 1 or a transmission end time of the data 1. Therefore, the second AP obtains the first indication information from the data 1, to determine the transmission end time of the data 1, and sends the second radio frame, namely, data 2 in the figure to the second STA, so that a transmission end time of the data 2 is the same as the transmission end time of the data 1, to align downlink data transmission. Optionally, after receiving the data 1 sent by the first AP, the first STA sends a BA frame 1 to the first AP. After receiving the data 2 sent by the second AP, the second STA sends a BA frame 2 to the first AP.

Therefore, in this scenario, the first indication information is used to indicate transmission duration of the first radio frame or a transmission end time of the first radio frame, so that the second AP determines the transmission end time of the second radio frame according to the first indication information, and the transmission end time of the second radio frame is the same as the transmission end time of the first radio frame.

Scenario 2: The first AP sends the first radio frame to the second AP, and then sends a third radio frame to the associated first STA.

Figure 4C:
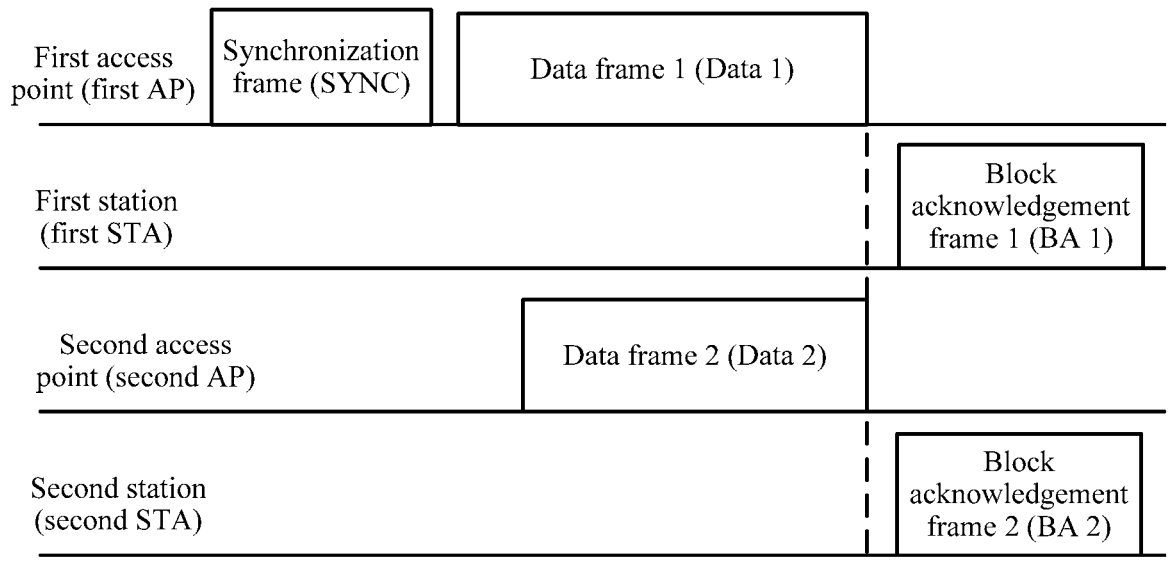
FIG. 4c is another example of a schematic diagram of downlink aligned transmission according to an embodiment of this application.

For ease of understanding, FIG. 4c is an example of a schematic diagram of downlink aligned transmission based on Scenario 2 according to this embodiment. In the figure, the first AP sends the first radio frame, namely, a SYNC frame in the figure to the second AP, and sends the third radio frame, namely, data 1 in the figure to the first STA. The SYNC frame carries the first indication information, and the first indication information may be used to indicate transmission duration of the data 1 or a transmission end time of the data 1. Therefore, the second AP determines the transmission end time of the data 1 according to the first indication information, and sends the second radio frame, namely, data 2 in the figure to the second STA, so that a transmission end time of the data 2 is the same as the transmission end time of the data 1, to align downlink data transmission. Optionally, after receiving the data 1 sent by the first AP, the first STA sends a BA frame 1 to the first AP. After receiving the data 2 sent by the second AP, the second STA sends a BA frame 2 to the first AP.

Therefore, in this scenario, the first indication information is used to indicate transmission duration of the third radio frame or a transmission end time of the third radio frame, so that the second AP determines a transmission end time of the second radio frame according to the first indication information, and the transmission end time of the second radio frame is the same as the transmission end time of the third radio frame.

Scenario 3: The first AP sends the first radio frame to the second AP.

Figure 4D:
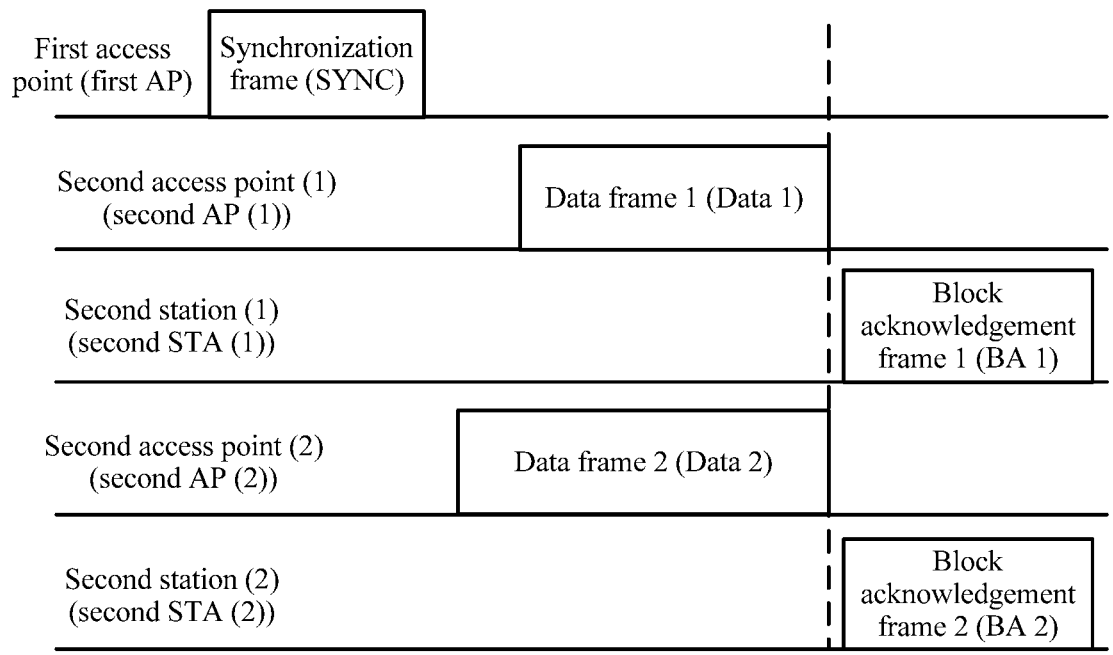
FIG. 4d is another example of a schematic diagram of downlink aligned transmission according to an embodiment of this application.

For ease of understanding, FIG. 4d is an example of a schematic diagram of downlink aligned transmission based on Scenario 3 according to this embodiment. In the figure, the first AP sends the first radio frame, namely, a SYNC frame in the figure to the second AP, to trigger a plurality of second APs to send second radio frames, namely, data in the figure, for example, trigger a second AP (1) to send data 1, and trigger a second AP (2) to send data 2. The first radio frame carries the first indication information, and the first indication information may be used to indicate a transmission end time of data sent by each second AP. It should be noted that, to align downlink data transmission, the data sent by the second APs has a same transmission end time. Optionally, after receiving the data 1 sent by the second AP (1), a second STA (1) sends a BA frame 1 to the second AP (1). After receiving the data 2 sent by the second AP (2), a second STA (2) sends a BA frame 2 to the second AP (2).

Therefore, in this scenario, the first indication information is used to indicate a transmission end time of the second radio frame, so that the plurality of second APs determine a transmission end time of each second radio frame according to the first indication information, and the second radio frames have a same transmission end time.

Similar to the first radio frame generated in step 203 shown in FIG. 2a, in this embodiment, the first radio frame generated by using step 403 may also include but is not limited to one or a combination of a plurality of indication information shown in Table 3:

TABLE 3

| Indication information | Indication content |
| --- | --- |
| Second indication information | Identifier information of the second AP |
| Third indication information | Whether a channel needs to be sensed |
| Fourth indication information | Transmit power information of the second AP |
| Fifth indication information | Transmit power information of the first AP |
| Sixth indication information | Information about a maximum tolerable interference threshold for the first AP |
| Seventh indication information | Identifier information of the first STA |
| Eighth indication information | Transmit power information of the first STA |
| Ninth indication information | Length of a padding field |
| Tenth indication information | Resource scheduling information |
| Eleventh indication information | Downlink transmission |
| Twelfth indication information | Synchronous transmission is not required |
| Thirteenth indication information | Aligned transmission is required |
| Fourteenth indication information | Mode for multi-AP transmission |
| Fifteenth indication information | The second radio frame carries an ACK policy |

The second indication information to the eleventh indication information and the fifteenth indication information are similar to the second indication information to the eleventh indication information and the fifteenth indication information that are included in the first radio frame in FIG. 2a. Details are not described herein again.

The twelfth indication information is used to indicate that the second AP does not need to perform synchronous transmission, to be specific, the plurality of APs may independently determine a transmission start time, provided that a same transmission end time can be ensured.

The thirteenth indication information is used to indicate that aligned transmission is required, to be specific, the plurality of APs need to have a same transmission end time.

The fourteenth indication information is used to indicate that synchronous transmission is not required, and synchronization and alignment are required.

It should be noted that, in this embodiment, the first AP accesses the channel by using step 401, and determines the second AP and generates the first radio frame by using step 402 and step 403. The steps are not limited to a particular order in the two processes, and step 401 may be performed first, or step 402 and step 403 may be performed first, or the steps are simultaneously performed. This is not specifically limited herein.

404. The second AP receives the first radio frame sent by the first AP.

In Scenario 1 described in step 403 in this embodiment, the first indication information in the first radio frame is used to indicate the transmission duration of the first radio frame or the transmission end time of the first radio frame. When the first indication information is used to indicate the transmission duration of the first radio frame, the second AP determines the transmission end time of the first radio frame based on a transmission start time of the first radio frame and the transmission duration of the first radio frame, and determines the transmission end time of the first radio frame as the transmission end time of the second radio frame sent to the second STA. When the first indication information is used to indicate the transmission end time of the first radio frame, the second AP directly uses the transmission end time of the first radio frame as the transmission end time of the second radio frame sent to the second STA.

It should be noted that, to help the second AP quickly detect indication information in the first radio frame, the indication information may be carried in a physical layer preamble in a physical layer protocol data unit in which the first radio frame is located.

In Scenario 2 described in step 403 in this embodiment, the first indication information is used to indicate the transmission duration of the third radio frame or the transmission end time of the third radio frame. A manner in which the second AP determines the transmission end time of the second radio frame according to the first indication information is similar to a manner of determining the transmission end time of the second radio frame in Scenario 1. Details are not described herein again.

In Scenario 3 described in step 403 in this embodiment, the first indication information is used to indicate the transmission end time of the second radio frame, and the second AP directly obtains the transmission end time of the second radio frame according to the first indication information.

Optionally, when the first radio frame further includes but is not limited to one or a combination of a plurality of the second indication information to the fifteenth indication information in Table 3, a manner in which the second AP receives and processes the first radio frame is similar to that in step 204 shown in FIG. 2*a*. Details are not described herein again.

Optionally, in this embodiment, after receiving the first radio frame sent by the first AP, the second AP further sends a first acknowledgement frame in response to the first radio frame to the first AP. In addition, when there are a plurality of second APs, there are also a plurality of corresponding first acknowledgement frames. Therefore, to implement aligned transmission of the plurality of first acknowledgement frames, the first radio frame may further include a transmission end time of the first acknowledgement frame, so that after receiving the first radio frame, the plurality of second APs send a plurality of first acknowledgement frames with a same transmission end time to the first AP.

405. The second AP sends the second radio frame to the second STA.

In this embodiment, step 405 is similar to step 205 shown in FIG. 2*a*. Details are not described herein again.

It should be noted that, in this embodiment, the second AP determines the transmission end time of the sent second radio frame. In step 205 shown in FIG. 2*a*, the second AP further determines a transmission start time of the second radio frame.

406. The first AP sends a fourth radio frame to the first STA.

As described in Scenario 1 to Scenario 3 described in step 403, this step is an optional step. This step is separately described based on three scenarios.

Scenario 1: The first AP sends the first radio frame to the first STA, in other words, the fourth radio frame is the first radio frame.

After generating the first radio frame, the first AP sends the first radio frame to the associated first STA, and the first radio frame also needs to be sent to the second AP, to instruct the second AP to align downlink transmission. The transmission end time of the first radio frame is the same as the transmission end time of the second radio frame.

Optionally, the indication information in the first radio frame may be carried in the physical layer preamble of the first radio frame.

Scenario 2: The first AP sends the third radio frame to the first STA, in other words, the fourth radio frame is the third radio frame.

After sending the first radio frame to the second AP, the first AP sends the third radio frame to the associated first STA, and the first indication information in the first radio frame is used to indicate the transmission duration or the transmission end time of the third radio frame, so that the transmission end time of the second radio frame sent by the second AP is the same as the transmission end time of the third radio frame.

Scenario 3: The first AP does not send a radio frame to the first STA.

In this scenario, the first AP may not send a radio frame to the first STA, but merely triggers the plurality of second APs to send second radio frames, to implement aligned transmission of the plurality of second radio frames.

407. The second STA sends a second acknowledgement frame to the second AP.

408. The first STA sends a fourth acknowledgement frame to the first AP.

In this embodiment, step 407 and step 408 are similar to step 207 and step 408 shown in FIG. 2*a*. Details are not described herein again.

It should be noted that, in this embodiment, in addition to implementing aligned transmission of downlink radio frames, aligned transmission of uplink acknowledgement frames can be further implemented. For example, aligned transmission of the second acknowledgement frame and the fourth acknowledgement frame is implemented, or aligned transmission of a plurality of second acknowledgement frames is implemented. Details are as follows:

The first radio frame may further include a transmission end time of the second acknowledgement frame, so that after obtaining the transmission end time of the second acknowledgement frame, the second AP may indicate the transmission end time of the second acknowledgement frame to the second STA by using the second radio frame, and after receiving the second radio frame, the second STA sends the second acknowledgement frame to the second AP. In addition, the transmission end time of the second acknowledgement frame is indicated by the first radio frame.

Optionally, after the first AP sends the fourth radio frame to the first STA, the fourth radio frame may include a transmission end time of the fourth acknowledgement frame. The transmission end time of the fourth acknowledgement frame is the same as the transmission end time of the second acknowledgement frame.

In conclusion, in this embodiment, aligned transmission of acknowledgement frames can be implemented, and a case in which while one STA sends an acknowledgement frame, another STA receives a data frame or a control frame is avoided, thereby reducing interference between the STAs and interference between the APs.

Similar to the first radio frame in the embodiment shown in FIG. 2*a*, the first radio frame in this embodiment may also trigger a plurality of aligned transmissions, and a trigger manner is similar to a trigger manner of the first radio frame in the embodiment shown in FIG. 2*a*. Details are not described herein again.

In this embodiment of this application, the plurality of APs coordinate scheduled sending procedures and signaling, to implement coordinated multi-AP parallel aligned downlink transmission, thereby reducing interference and increasing a throughput.

It should be understood that, at a given signal-to-interference ratio (signal to interference ratio, SIR), when a transmit end selects an excessively high MCS, because an SIR at a receive end cannot reach an SIR required by the high MCS, a packet loss occurs. When the transmit end selects an excessively low MCS, although a packet loss probability is very low, the low MCS causes a relatively low data transmission rate, and a channel cannot be fully used. Therefore, to help a plurality of APs perform coordinated scheduling, each AP should learn how high an SIR that can be obtained by a STA associated with the AP during parallel transmission of the plurality of APs is, so that the AP selects a suitable MCS when scheduling the STA to perform transmission.

Therefore, an embodiment of this application provides a channel information prediction method, used to predict an SIR of a station during coordinated multi-AP scheduling, to allocate a suitable MCS, thereby achieving balance between a transmission rate and a packet loss rate. For details, refer to FIG. 5a that is an example of a flowchart of an information prediction method according to an embodiment of this application. The method includes the following steps.

501. A first AP sends a broadcast frame.

The first AP sends the broadcast frame to all STAs associated with the first AP. The broadcast frame is used to indicate, to the STA associated with the first AP, a second AP on which signal quality detection needs to be performed, and the broadcast frame carries identifier information of the second AP. It should be noted that, the second AP includes at least one AP, and the second AP may include the first AP.

In this embodiment, there may be a plurality of cases for the identifier information of the second AP. In an example, the identifier information of the second AP may be a MAC address of the second AP. In another example, the identifier information of the second AP may be a part of a MAC address of the second AP, or an address assigned by the first AP to the second AP, or an address determined by the second AP and indicated to the first AP, so that the first AP adds the address to the broadcast frame, or the identifier information of the second AP is identifier information of a device (which may be a STA or an AP) having a coupling relationship with the second AP, so that after receiving a frame sent by the first AP to the second AP, the device forwards the frame to the second AP through an internal interface between the device and the second AP. Therefore, the identifier information of the second AP is not specifically limited herein.

For ease of description, in this embodiment, any one or more of the STAs associated with the first AP is referred to as a first STA. Therefore, the first AP sends a broadcast frame to the first STA, to trigger the first STA to detect a channel between the second AP and the first STA.

In this embodiment, the broadcast frame may be an existing management frame such as a beacon frame (Beacon) or a Probe Request frame in an 802.11 standard, or may be in a frame format defined by a nonstandard vendor, or the like. This is not specifically limited herein.

It should be noted that, in this embodiment, the second AP may also receive the broadcast frame sent by the first AP.

502. The first STA receives a radio frame sent by a target AP.

In this embodiment, an AP that can communicate with the first STA is referred to as the target AP. It may be understood that, the target AP is some or all of second APs. Therefore, the first STA receives the radio frame sent by the target AP, to detect a channel between the first STA and the target AP.

It should be noted that, in this embodiment, the radio frame received by the first STA may be autonomously sent by the target AP, or may be sent by the target AP after the target AP is triggered by the first AP. Descriptions are separately provided below:

Example 1: The radio frame is autonomously sent by the target AP.

In this example, the radio frame may be a beacon frame sent by the target AP. The beacon frame may be used to measure a path loss (path loss) from the target AP to a beacon frame receiver (namely, the first STA). The beacon frame may carry a measurement report of the target AP. The measurement report may include but is not limited to one or more types of the following information: transmit power of the target AP and a signal received level and power of a device around the target AP.

Example 2: The radio frame is sent by the target AP after the target AP is triggered by the first AP.

In this example, the broadcast frame in step 501 may be further used to trigger the second AP to sequentially send null data packets (null data packet, NDP), the broadcast frame further includes order indication information, and the order indication information is used to indicate an order in which the second AP sends NDP frames. It should be noted that, the broadcast frame may be an enhanced-null data packet indication (enhanced-null data packet announcement, E-NDPA) frame.

Therefore, after receiving the broadcast frame sent by the first AP, the second AP sequentially sends the NDP frames according to the order indication information in the broadcast frame. An inter-frame spacing may be an SIFS. It should be noted that, the inter-frame spacing may be a default interval or may be defined by the first AP. When the inter-frame spacing is defined by the first AP, the broadcast frame further carries indication information for the inter-frame spacing. For ease of understanding, FIG. 5b is an example of a schematic diagram of transmission according to this embodiment. In the figure, an AP 1 broadcasts an E-NDPA frame (which may be understood as the broadcast frame). Therefore, the AP 1 to an AP 3 sequentially send NDP frames in an order indicated in the E-NDPA frame. For example, the AP 1 first sends an NDP frame 1, the AP 2 then sends an NDP frame 2, and the AP 3 finally sends an NDP frame 3. Optionally, the AP 1 may further send a trigger (Trigger) frame, used to trigger the first STA to send a feedback (Feedback) frame, so that after receiving the trigger frame, the first STA feeds back a corresponding feedback frame 1 to feedback frame 3 based on the received NDP frame 1 to NDP frame 3.

Optionally, the broadcast frame may further include identifier information of a STA whose channel needs to be detected. The identifier information of the STA whose channel needs to be detected may be a MAC address or an IP address.

Therefore, in the foregoing two examples, a difference lies in that, in Example 1, the first STA receives the radio frame (such as the beacon frame) autonomously sent by the second AP, and then detects the channel based on received signal strength of the beacon frame; and in Example 2, each second AP sends the NDP frames in the order indicated by the first AP, so that the first AP detects the channel based on the received NDP frames.

503. The first STA determines channel quality information of a target channel based on the radio frame.

It should be noted that, when Example 2 in step 502 is used, to be specific, when the radio frame may be an NDP frame, the first STA further needs to determine the target AP based on the received NDP frames. This includes: obtaining, by the first STA according to second indication information in the broadcast frame, the order in which the second AP sends the NDP frames, and determining, based on a ranking of the received radio frame, the target AP that sends the radio frame. For example, the AP 1 first sends an NDP 1, the AP 2 then sends an NDP 2, the AP 3 then sends an NDP 3, and so on. When receiving the second NDP, namely, the NDP 2, the first STA may determine, in the order in which the second AP sends the NDP frames, that a target AP that sends the second NDP is the AP 2.

Therefore, after receiving the radio frame sent by the target AP, the first STA determines the channel quality information of the target channel (namely, the channel between the first STA and the target AP) based on the radio frame. Specifically, the first STA may obtain a received signal strength indication (received signal strength indication, RSSI) of the target AP or transmit power of the target AP based on a measurement report of the target AP that is carried in the radio frame. Therefore, the channel quality information of the target channel that is determined by the first STA may be the RSSI of the target AP, or may be the transmit power of the target AP, or may be a path loss (path loss) between the target AP and the first STA. Therefore, in this embodiment, the channel quality information of the target channel may include a plurality of types of content. This is not specifically limited herein.

Optionally, when the channel quality information is the path loss between the target AP and the first STA, the first STA further needs to calculate the channel quality information by using the transmit power and the RSSI of the target AP. A specific calculation manner may be:

path loss=$TX$ power+$Gr$+$Gt$−RSSI, where TX power indicates the transmit power of the target AP, Gr indicates a receive antenna gain, Gt indicates a transmit antenna gain, RSSI indicates signal received strength of the target AP, and Gr and Gt are preset values. It should be noted that, in actual application, there are a plurality of manners of calculating the path loss. The manners are not described in detail herein one by one.

504. The first STA receives a trigger frame sent by the first AP.

Optionally, the first STA may further receive the trigger frame sent by the first AP. The trigger frame is used to trigger the first STA to send a feedback frame, and the trigger frame may include resource configuration indication information. The resource configuration indication information is used to indicate a wireless channel resource used by each first STA to reply with a feedback frame. The resource configuration information may include but is not limited to one or a combination of a plurality of the following information: RU allocation information of the first STA, spatial stream (spatial and time stream, STS) information, or an orthogonal code.

It should be noted that, the trigger frame generated by the first AP may be designed based on a trigger frame defined in the 802.11ax standard, as shown in FIG. 5c to FIG. 5e. FIG. 5c is an example of a diagram of a frame structure of the trigger frame defined in the 802.11ax standard. The trigger frame includes a plurality of parts, for example, Frame Control, Common info, and User info. FIG. 5d is a schematic diagram of information included in the Common info part in the trigger frame shown in FIG. 5c. FIG. 5e is a schematic diagram of information included in the User info part in the trigger frame shown in FIG. 5c. As shown in FIG. 5c, when values of a trigger type subfield are different in the Common info part of the trigger frame, the trigger frame has different functions. Table 4 is an example of a table of correspondences between values of the trigger type subfield and types:

TABLE 4

| Trigger type field value | Description |
|---|---|
| 0 | Basic trigger (Basic Trigger) |
| 1 | Beamforming report poll (Beamforming Report Poll, BRP) |
| 2 | Multi-user block acknowledgement request (multi-user block ACK request, MU-BAR) |
| 3 | Multi-user request to send (multi-user request to send, MU-RTS) |
| 4 | Buffer status report feedback (buffer status report poll, BSRP) |
| 5 | Groupcast with retries (groupcast with retries, GCR) MU-BAR |
| 6 | Bandwidth query feedback (bandwidth query poll, BQRP) |
| 7 | Null data packet feedback report feedback (NDP Feedback Report Poll) |
| 8-15 | Reserved (Reserved) |

In an example, the value of the trigger type subfield may be set to a specific value. For example, the value of the trigger type subfield is a value from 8 to 15. When the first AP sends the trigger frame to the first STA, it indicates that the trigger frame is used to trigger the first STA to send a feedback frame.

It should be noted that, the first STA determines the channel quality information of the target channel by using step 502 and step 503, and the first STA receives, by using step 504, the trigger frame sent by the first AP. The steps are not limited to a particular order in the two processes, and step 502 and step 503 may be performed first, or step 504 may be performed first, or the steps are simultaneously performed. This is not specifically limited herein.

505. The first STA sends a feedback frame to the first AP.

In response to the trigger frame sent by the first AP, the first STA sends the feedback frame to the first AP. The feedback frame includes the channel quality information of the target channel, and the target channel is the channel between the first STA and the target AP. It may be understood that, the feedback frame includes identifier information of the target AP, to indicate a detected AP to the first AP. The identifier information of the target AP may be a MAC address of the target AP.

Optionally, in this embodiment, to reduce a length of the feedback frame, a short ID may be used as an identifier of the target AP. A specific operation is as follows:

The broadcast frame in step 501 further includes fourth indication information, and the fourth indication information is used to indicate a short ID of each second AP. FIG. 5f is an example of a schematic diagram of a frame structure of the broadcast frame. In the figure, each AP info field includes a corresponding MAC address and feedback ID (namely, the short ID). Therefore, correspondingly, when the first STA sends a feedback frame to the first AP, the feedback frame carries the short ID for indicating the identifier information of the target AP. FIG. 5g is an example of a schematic diagram of a frame structure of the feedback frame. In the figure, each AP feedback info field includes a corresponding feedback ID (namely, the short ID) and the channel quality information (such as the RSSI).

Optionally, the feedback frame sent by the first STA may include a plurality of types of channel quality information, for example, may include the RSSI of the target AP and the transmit power information of the target AP. FIG. 5h is an example of a schematic diagram of a frame structure of the feedback frame. In the figure, each AP feedback info field includes a corresponding feedback ID, TX power, RSSI, and the like. Alternatively, the channel quality information may further directly include the path loss between the first STA and the target AP. A value of the path loss is obtained by the first STA through calculation by using the transmit power and the RSSI of the target AP. FIG. 5i is another example of a schematic diagram of a frame structure of the feedback frame. In the figure, each AP feedback info field includes a corresponding feedback ID, path loss, and the like.

Optionally, in Example 2, because the first STA may receive NDP frames from the first AP and the second AP. Therefore, the first STA may calculate an SIR or an interference-to-signal ratio (interference to signal ratio, ISR) of the second AP based on receive power of two NDP frames, and adds the SIR or the ISR of the second AP to the feedback frame.

Therefore, content included in the feedback frame sent by the first STA to the first AP is not specifically limited in this embodiment.

506. The first AP predicts an SIR of the first STA based on the channel quality information of the target channel.

After receiving the feedback frame sent by the first STA, the first AP predicts the SIR of the first STA based on the channel quality information of the target channel that is included in the feedback frame. A calculation formula for the SIR of the first STA may be: SIR=(transmit power of the first AP-path loss between the first AP and the first STA)/(transmit power of the target AP-path loss between the target AP and the first STA), so that the first AP may directly or indirectly obtain the path loss between the target AP and the first STA by using the channel quality information of the target channel that is fed back by the first STA, to calculate the SIR of the first STA.

Optionally, the first AP may further calculate an ISR of the first STA, where ISR×SIR=1.

Optionally, this application may further provide an information prediction method, including: maintaining, by each AP, sensing a channel, obtaining an RSSI of each STA (including a STA in a local cell and a STA in another cell) based on a sensing result, and then sending information about the obtained RSSI to another AP. After obtaining the information about the RSSI that is sent by the another AP, each AP may calculate an SIR of each STA during parallel transmission, to use the SIR as an input for coordinated multi-AP scheduled transmission. For ease of understanding, for example, it is assumed that there are two APs: an AP 1 and an AP 2, the AP 1 is associated with a STA 1, and the AP 2 is associated with a STA 2. In historical transmission, the AP 1 detects signals of the STA 1 and the STA 2, and similarly, the AP 2 also detects signals of the STA 1 and the STA 2. After the AP 1 sends signal strength of the STA 1 and the STA 2 to the AP 2, if the AP 2 needs to obtain an SIR of the STA 2 during parallel transmission, the SIR may be obtained by dividing signal strength of the STA 2 that is sensed by the AP 2 by the signal strength of the STA 2 that is sent by the AP 1.

Figure 5A:
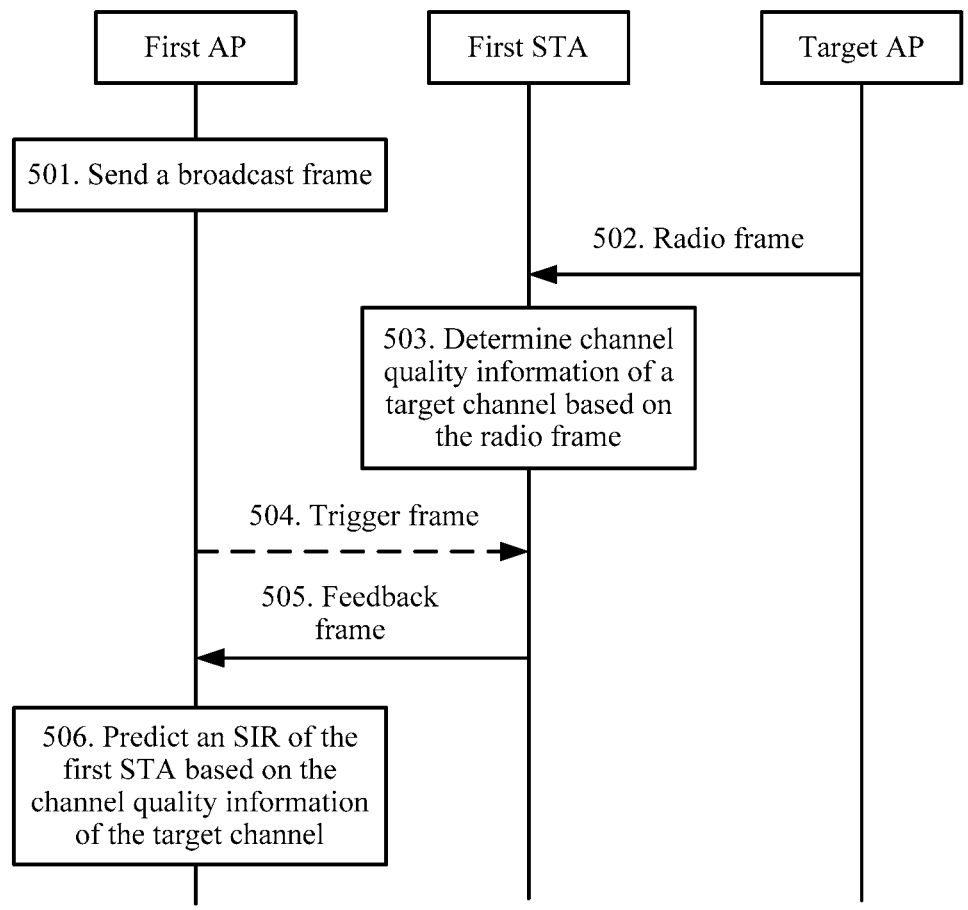
FIG. 5a is an example of a flowchart of an information prediction method according to an embodiment of this application.
Figure 5B:
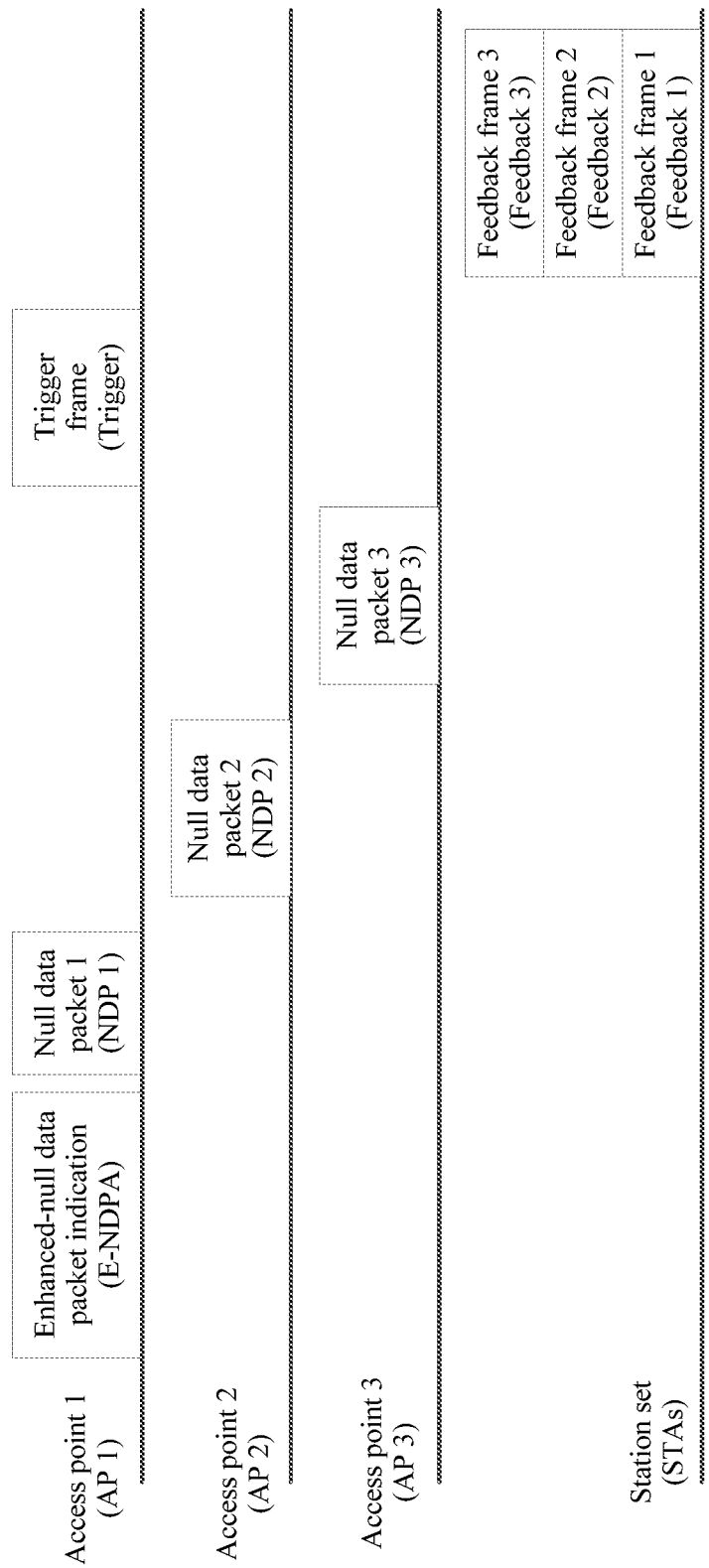
FIG. 5b is an example of a schematic diagram of transmission according to an embodiment of this application.
Figure 5F:
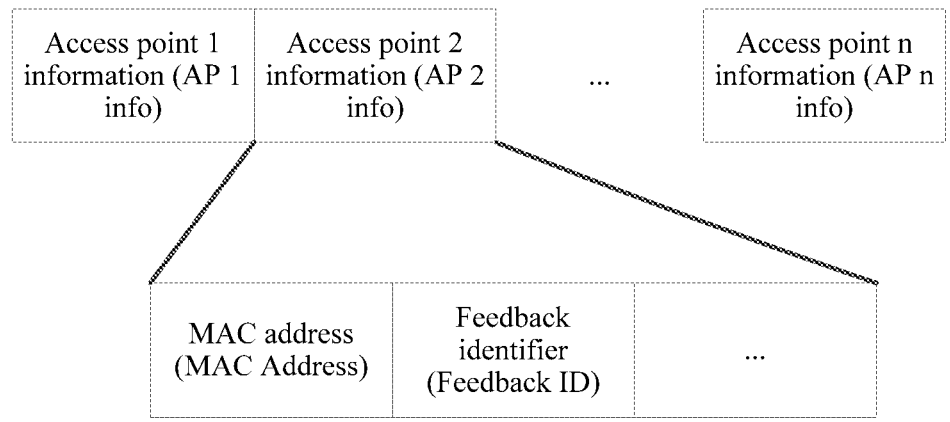
FIG. 5*f* is an example of a schematic diagram of a frame structure of a broadcast frame according to an embodiment of this application.
Figure 5G:
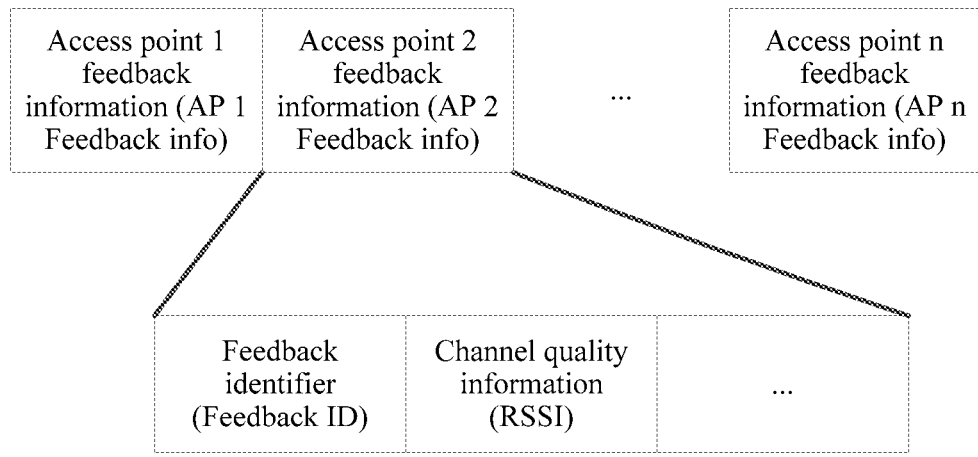
FIG. 5*g* is an example of a schematic diagram of a frame structure of a feedback frame according to an embodiment of this application.
Figure 5H:
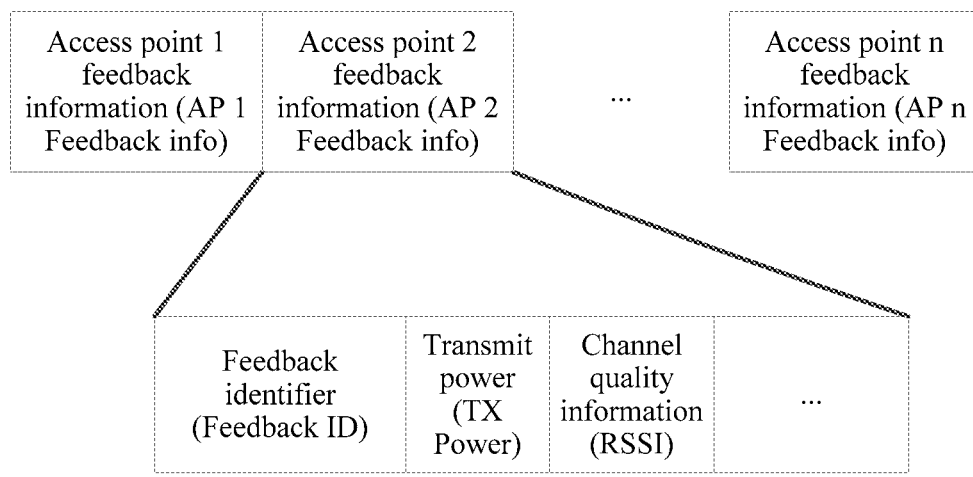
FIG. 5*h* is another example of a schematic diagram of a frame structure of a feedback frame according to an embodiment of this application.
Figure 5I:
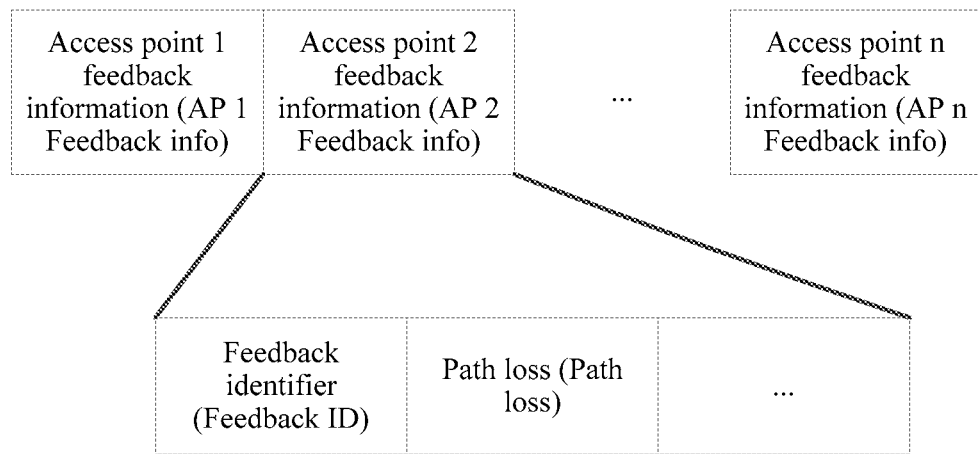
FIG. 5*i* is another example of a schematic diagram of a frame structure of a feedback frame according to an embodiment of this application.

It should be noted that, the information prediction method shown in FIG. 5a may be applied to a scenario of the method for multi-AP coordination in the embodiments of this application, and may be further independently applied to another scenario in which information prediction needs to be performed before data transmission. Therefore, an actual application scenario of the information prediction method provided in FIG. 5a of this application is not specifically limited herein.

The method for multi-AP coordination in the embodiments of this application is described above, and an apparatus for coordinated multi-access point AP transmission is described in detail below from a perspective of hardware processing.

Figure 6:
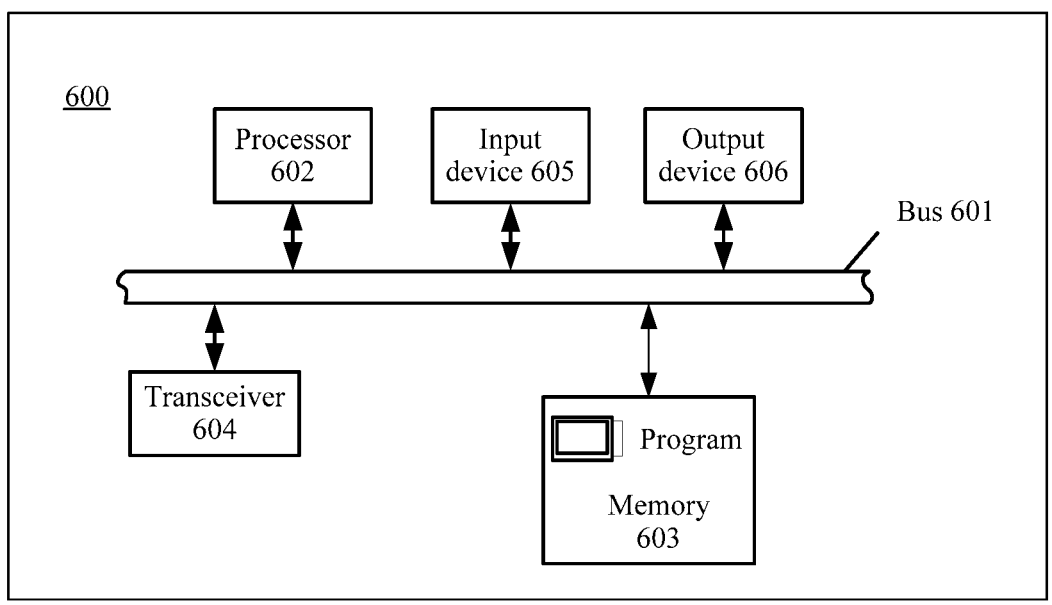
FIG. 6 is an example of a schematic structural diagram of an apparatus for coordinated multi-AP transmission according to an embodiment of this application.

FIG. 6 is a possible schematic structural diagram of an apparatus 600 for coordinated multi-access point AP transmission in the foregoing embodiment. The apparatus 600 may be configured as the foregoing first access point AP, and the apparatus 600 may include a processor 602, a computer-readable storage medium/memory 603, a transceiver 604, an input device 605, an output device 606, and a bus 601. The processor, the transceiver, the computer-readable storage medium, and the like are connected by using the bus. A specific connection medium between the foregoing components is not limited in this embodiment of this application.

The transceiver 604 may be configured to support the first AP in communicating with the second access point AP in the foregoing embodiment, and further support the first AP in communicating with one or more first STAs associated with the first access point AP in the foregoing embodiment, and may perform sending and receiving processes of the first AP in FIG. 2a to FIG. 5i and/or another process used for the technology described in this application. For example, the transceiver 604 may be configured to: send at least a first radio frame to the second access point AP, where the first radio frame includes indication information used to indicate transmission duration of a second radio frame sent by the second AP; and send a third radio frame to a first station STA in a sending period of the second radio frame, where transmission duration of the third radio frame is the same as the transmission duration of the second radio frame. The transceiver 604 may further perform step 208 in FIG. 2a, step 306 and step 310 in FIG. 3a, step 408 in FIG. 4a, and step 501, step 504, and step 505 in FIG. 5a. Certainly, the transceiver 604 may be further configured to perform another process and method in the technology described in this application.

The processor 602 is configured to control and manage an action of the first AP, is configured to perform processing performed by the first AP in the foregoing embodiment, may perform processing processes of the first AP in FIG. 2a to FIG. 5i and/or another process used for the technology described in this application, may be responsible for managing the bus, and may execute a program or an instruction stored in the memory. For example, the processor 602 may perform step 201 to step 203 in FIG. 2a, step 301 to step 303 in FIG. 3a, step 401 to step 403 in FIG. 4a, and step 506 in FIG. 5a.

The computer-readable storage medium/memory 603 stores a program, an instruction, or data for performing the technical solutions of this application. For example, the computer-readable storage medium/memory 603 may include an instruction allowing the apparatus 600 to send the first radio frame to one or more second APs, may further include an instruction allowing the apparatus 600 to send the third radio frame to the first station STA in the sending period of the second radio frame, and may further include an instruction allowing the apparatus 600 to implement sending and receiving processes and processing processes of the first AP in FIG. 2a to FIG. 5i and/or another process used for the technology described in this application.

It may be understood that, FIG. 6 merely shows a simplified design of the first AP. In actual application, the first AP may include any quantities of transceivers, processors, memories, and the like, and all first APs that can implement this application shall fall within the protection scope of this application.

Figure 7:
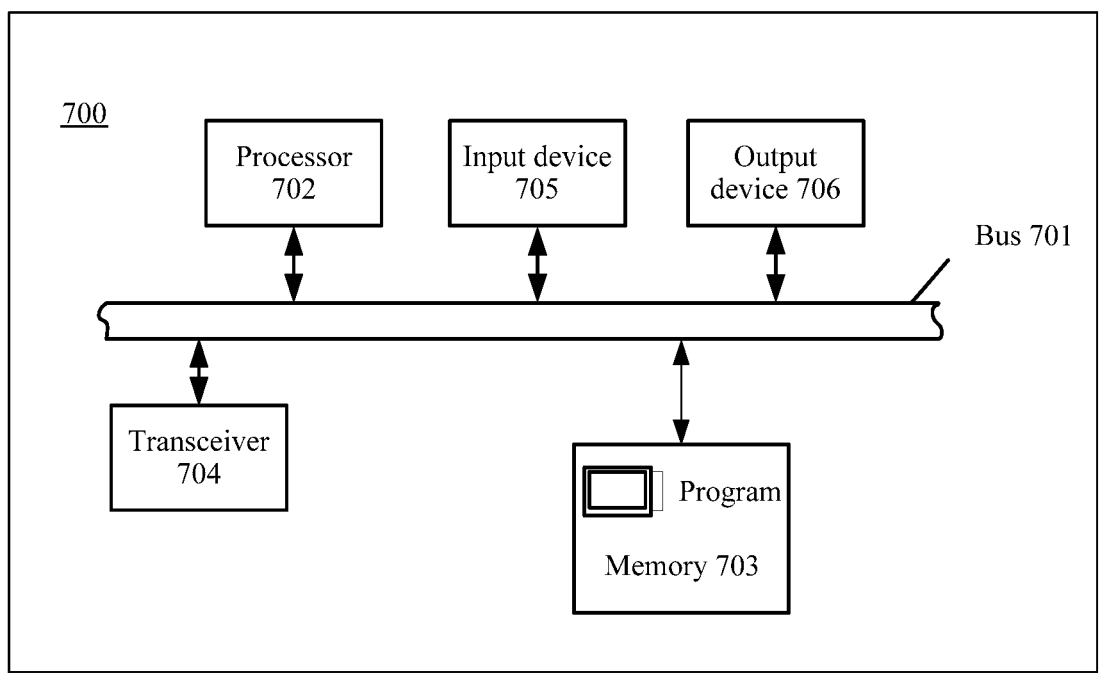
FIG. 7 is another example of a schematic structural diagram of an apparatus for coordinated multi-AP transmission according to an embodiment of this application.

FIG. 7 is a possible schematic structural diagram of an apparatus 700 for coordinated multi-access point AP transmission in the foregoing embodiment. The apparatus 700 may be configured as the foregoing second AP, and the apparatus 700 includes a processor 702, a computer-readable storage medium/memory 703, a transceiver 704, an input device 705, an output device 706, and a bus 701. The processor, the transceiver, the computer-readable storage medium, and the like are connected by using the bus. A specific connection medium between the foregoing components is not limited in this embodiment of this application.

The transceiver 704 may be configured to support the second AP in communicating with the first AP, and further support the second AP in communicating with one or more second STAs associated with the second access point AP in the foregoing embodiment, and may perform a communication or interaction process of the second AP in FIG. 2a to FIG. 4d and/or another process used for the technology described in this application. For example, the transceiver 704 may be configured to: receive at least a first radio frame sent by the first AP, and may be further configured to send a second radio frame to a second STA after receiving the first radio frame. The transceiver 704 may be further configured to perform step 204, step 205, and step 207 in FIG. 2a, step 304 to step 307 in FIG. 3a, and step 404, step 405, and step 407 in FIG. 4a. Certainly, the transceiver 904 may be further configured to perform another process and method in the technology described in this application.

The processor 702 is configured to control and manage an action of the second AP, is configured to perform processing performed by the second AP in the foregoing embodiment, may perform processing processes of the second AP in FIG. 2a to FIG. 4d and/or another process used for the technology described in this application, may be responsible for managing the bus, and may execute a program or an instruction stored in the memory.

The computer-readable storage medium/memory 703 stores a program, an instruction, and data for performing the technical solutions of this application. For example, the computer-readable storage medium/memory 703 may include an instruction allowing the apparatus 700 to receive the first radio frame sent by the first AP, may further include an instruction allowing the apparatus 700 to send the second radio frame to the second STA after receiving the first radio frame, and may further include an instruction allowing the apparatus 700 to implement sending and receiving processes and processing processes of the second AP in FIG. 2a to FIG. 4d and/or another process used for the technology described in this application.

It may be understood that, FIG. 7 merely shows a simplified design of the second AP. In actual application, the second AP may include any quantities of transceivers, processors, memories, and the like, and all second APs that can implement this application shall fall within the protection scope of this application.

The processor in the apparatus 600 and the apparatus 700 may be a general-purpose processor, for example, a general-purpose central processing unit (CPU), a network processor (network processor, NP), or a microprocessor, or may be an application-specific integrated circuit (application-specific integrated circuit, ASIC), or one or more integrated circuits configured to control program execution of the solutions of this application. The processor may be alternatively a digital signal processor (digital signal processor, DSP), a field-programmable gate array (field-programmable gate array, FPGA), another programmable logic device, a discrete gate or transistor logic device, or a discrete hardware component. Alternatively, the controller/processor may be a combination of processors implementing a computing function, for example, a combination of one or more microprocessors, or a combination of a DSP and a microprocessor. The processor usually performs logical and arithmetic operations based on a program instruction stored in the memory.

The computer-readable storage medium/memory 603 and the computer-readable storage medium/memory 703 may further store an operating system and another application program. Specifically, the program may include program code, and the program code includes a computer operation instruction. More specifically, the memory may be a read-only memory (read-only memory, ROM), another type of static storage device that can store static information and an instruction, a random access memory (random access memory, RAM), another type of dynamic storage device that can store information and an instruction, a magnetic disk memory, or the like. The memory 603 may be a combination of the foregoing storage types. In addition, the computer-readable storage medium/memory may be located in the processor, or may be located outside the processor, or distributed in a plurality of entities including a processor or a processing circuit. The computer-readable storage medium/memory may be specifically embodied in a computer program product. For example, the computer program product may include a computer-readable medium in packaging materials.

Alternatively, the apparatus 600 and the apparatus 700 may also be configured as general-purpose processing systems, which, for example, are usually referred to as chips. The general-purpose processing system includes one or more microprocessors providing processor functions, and an external memory providing at least a part of a storage medium. All these components are connected to other supporting circuits through an external bus architecture. When executed by the processor, the instruction stored in the memory enables the processor to perform some or all of the steps of the method for coordinated multi-AP transmission of the first AP in the embodiments in FIG. 2a to FIG. 4d, and the channel information prediction method of the first AP in the embodiment in FIG. 5a to FIG. 5i, for example, step 201 to step 203 in FIG. 2a, step 301 to step 303 in FIG. 3a, step 401 to step 403 in FIG. 4a, step 506 in FIG. 5a, and/or another process used for the technology described in this application; or the processor is enabled to perform some or all of the steps of the method for coordinated multi-AP transmission of the second AP in the embodiments in FIG. 2a to FIG. 4d, and/or another process used for the technology described in this application; or the processor is enabled to perform some or all of the steps of the channel information prediction method of the first STA in the embodiment in FIG. 5a to FIG. 5i, for example, step 503 in FIG. 5a, and/or another process used for the technology described in this application.

Method or algorithm steps described in combination with the content disclosed in this application may be implemented by hardware, or may be implemented by a processor executing a software instruction. The software instruction may be formed by a corresponding software module. The software module may be located in a RAM memory, a flash memory, a ROM memory, an EPROM memory, an EEPROM memory, a register, a hard disk, a removable hard disk, a CD-ROM, or a storage medium of any other form known in the art. For example, a storage medium is coupled to the processor, so that the processor can read information from the storage medium or write information into the storage medium. Certainly, the storage medium may be a component of the processor. The processor and the storage medium may be located in the ASIC. In addition, the ASIC may be located in user equipment. Certainly, the processor and the storage medium may exist in the user equipment as discrete components.

An embodiment of this application further provides an apparatus. The apparatus may be a chip, the apparatus may include a memory, and the memory is configured to store an instruction.

It may be clearly understood by persons skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions in the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to the prior art, or all or some of the technical solutions may be implemented in the form of a software product. The computer software product is stored in a storage medium and includes several instructions for instructing a computer device (which may be a personal computer, a server, a network device, or the like) to perform all or some of the steps of the methods described in the embodiments of this application. The foregoing storage medium includes: any medium that can store program code, such as a USB flash drive, a removable hard disk, a read-only memory (Read-Only Memory, ROM), a random access memory (Random Access Memory, RAM), a magnetic disk, or an optical disc.

In conclusion, the foregoing embodiments are merely intended for describing the technical solutions of this application, rather than limiting this application. Although this application is described in detail with reference to the foregoing embodiments, persons of ordinary skill in the art should understand that they may still make modifications to the technical solutions recorded in the foregoing embodiments or make equivalent replacements to some technical features thereof, without departing from the spirit and scope of the technical solutions in the embodiments of this application.

The invention claimed is:

1. A method for coordinated multi-access point (AP) transmission, comprising:
generating, by a first AP, a first radio frame, wherein the first radio frame comprises indication information indicating a transmission duration of a second radio frame sent by a second AP, and wherein the first radio frame carries transmit power information of the second AP;
sending, by the first AP, the first radio frame to the second AP; and
in a sending period of the second radio frame, sending, by the first AP, a third radio frame to a first station (STA) associated with the first AP.

2. The method according to claim 1, wherein the indication information comprises a sending time and an end time of the second radio frame.

3. The method according to claim 1, wherein a sending time of the third radio frame is the same as a sending time of the second radio frame.

4. The method according to claim 1, wherein a sending time of the third radio frame is earlier than a sending time of the second radio frame.

5. The method according to claim 1, wherein the indication information comprises identifier information of the second AP.

6. The method according to claim 1, wherein the first radio frame further carries one or more of the following: information about a maximum tolerable interference threshold for the first AP, or transmit power information of the first AP.

7. A method for coordinated multi-access point (AP) transmission, comprising:
receiving, by a second AP, a first radio frame sent by a first AP, wherein the first radio frame comprises indication information indicating a transmission duration of a second radio frame sent by a second AP, and wherein the first radio frame carries transmit power information of the second AP;
sending, by the second AP in a sending period of sending a third radio frame by the first AP to a first station (STA) associated with the first AP, the second radio frame to a second STA associated with the second AP.

8. The method according to claim 7, wherein the indication information comprises a sending time and an end time of the second radio frame.

9. The method according to claim 7, wherein a sending time of the second radio frame is the same as a sending time of the third radio frame.

10. The method according to claim 7, wherein a sending time of the second radio frame is earlier than a sending time of the third radio frame.

11. The method according to claim 7, wherein the indication information comprises identifier information of the second AP.

12. The method according to claim 7, wherein the transmission duration of the second radio frame is the same as a transmission duration of the third radio frame.

13. The method according to claim 7, wherein the first radio frame further carries one or more of the following: information about a maximum tolerable interference threshold for the first AP, or transmit power information of the first AP.

14. An apparatus, comprising:
- at least one processor; and
- one or more memories coupled to the at least one processor and storing programming instructions for execution by the at least one processor to:
  - generate a first radio frame, wherein the first radio frame comprises indication information indicating a transmission duration of a second radio frame sent by a second AP, and wherein the first radio frame carries transmit power information of the second AP;
  - send the first radio frame to the second AP; and
  - in a sending period of the second radio frame, send a third radio frame to a first station (STA) associated with a first AP.

15. The apparatus according to claim 14, wherein the indication information comprises a sending time and an end time of the second radio frame.

16. The apparatus according to claim 14, wherein a sending time of the third radio frame is the same as a sending time of the second radio frame.

17. The apparatus according to claim 14, wherein a sending time of the third radio frame is earlier than a sending time of the second radio frame.

18. The apparatus according to claim 14, wherein the indication information comprises identifier information of the second AP.

19. The apparatus according to claim 14, wherein the first radio frame further carries one or more of the following: information about a maximum tolerable interference threshold for the first AP, or transmit power information of the first AP.

* * * * *